United States Patent [19]
Honjo et al.

[11] Patent Number: 5,893,446
[45] Date of Patent: Apr. 13, 1999

[54] CLUTCH DISC ASSEMBLY

[75] Inventors: Hisashi Honjo, Moriguchi; Yasuyuki Hashimoto, Neyagawa, both of Japan

[73] Assignee: Exedy Corporation, Osaka, Japan

[21] Appl. No.: 08/691,637

[22] Filed: Aug. 2, 1996

[30] Foreign Application Priority Data

Aug. 11, 1995 [JP] Japan .................. 7-206272
Aug. 11, 1995 [JP] Japan .................. 7-206273
Nov. 16, 1995 [JP] Japan .................. 7-298733

[51] Int. Cl.$^6$ ................................. F16D 16/34
[52] U.S. Cl. ................ 192/204; 192/213.22
[58] Field of Search ................. 192/204, 213.2, 192/213.21, 213.22; 464/68

[56] References Cited

U.S. PATENT DOCUMENTS

| | | |
|---|---|---|
| 4,222,475 | 9/1980 | Fenart . |
| 4,406,357 | 9/1983 | Nagano et al. . |
| 4,453,838 | 6/1984 | Loizeau ............... 192/204 X |
| 4,548,309 | 10/1985 | Braun . |
| 5,016,744 | 5/1991 | Fischer et al. . |
| 5,064,041 | 11/1991 | Graton et al. ............... 192/204 |

FOREIGN PATENT DOCUMENTS

| | | |
|---|---|---|
| 31 04 181 A1 | 12/1981 | Germany . |
| 32 48 120 A1 | 6/1984 | Germany . |
| 27 51 044 C2 | 12/1987 | Germany . |
| 39 21 283 A1 | 8/1990 | Germany . |
| 32 48 119 C2 | 3/1992 | Germany . |

*Primary Examiner*—Khoi Q. Ta
*Assistant Examiner*—Saúl J. Rodriguez
*Attorney, Agent, or Firm*—Shinjyu Office of Patent Attorneys

[57] ABSTRACT

A clutch disc assembly is provided with a support structure and friction generating members that provide generally constant friction generation, even when misalignment occurs between adjacent members. The clutch disc assembly 1 includes a hub 2, a fourth friction washer 19, a clutch plate 3 and a second coil spring 7. The fourth friction washer 19 is fixed to the hub 2 and has a tapered surface 19a. The clutch plate 3 has an inner peripheral edge tapered portion 3c which is abutted against the tapered surface 19a and disposed on the outer periphery of the hub 2. The second coil spring 7 couples the hub 2 to the clutch plate 3 in a circumferential direction.

10 Claims, 21 Drawing Sheets

Fig.17
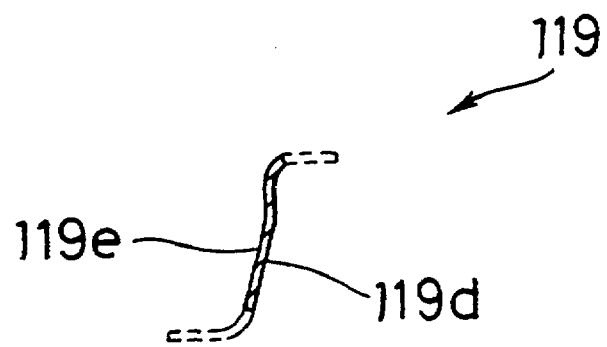
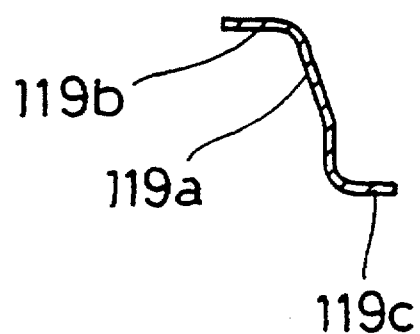

CLUTCH DISC ASSEMBLY

BACKGROUND OF THE INVENTION

1. Field of the Invention

The present invention relates to a clutch disc assembly for use in a clutch mechanism in a motorized vehicle where the clutch disc assembly is configured to allow for slight misalignment between a transmission input shaft and a flywheel of an engine.

2. Description of the Related Art

A clutch disc assembly used in a clutch mechanism in a motorized vehicle typically includes a pair of disc-shaped input plates, an output hub engaged with a flange in an outer periphery thereof, and an elastic member disposed so as to be compressed in a circumferential direction between the input plates and the output hub when the input plates and the output hub are rotated relatively. The input plate can be coupled to an engine flywheel, and a transmission shaft is inserted into a center of the output hub so as to be engaged with the output hub. The clutch disc assembly further includes a friction generation mechanism that produces a friction when the input plates and the output hub are relatively rotated.

Upon allowing torsional vibrations to be inputted to the clutch disc assembly thus organized, the input plates and the output hub are periodically rotated relatively through the elastic member, to thereby generate a hysteresis torque. As a result, the torsional vibrations are attenuated. The characteristics of a low rigidity (a wide twist angle) and a low hysteresis torque are preferable in order to attenuate the fine torsional vibrations.

The above-mentioned conventional clutch disc assembly also includes a bushing which is disposed in the inner peripheral edge of the input plates in such a manner that the bushing is abutted against the outer periphery of the hub, to thereby position the input plates with respect to the hub. It is very common for the transmission shaft to radially displaced or inclined with respect to the clutch disc assembly which is fixed to the flywheel of the engine, thus producing a slight misalignment. The hub being in engagement with the transmission shaft, is therefore radially displaced or inclined with respect to the input plates due to the misalignment of the shaft. However, because the hub cannot move radially with respect to the input plate, an unbalanced load is developed between the outer peripheral surface of the hub and the inner peripheral portion of the bushing. For that reason, when the transmission of the torsional vibrations makes the input plates and the hub rotate relatively, unwanted friction is produced between the bushing and the hub in response to relative rotation therebetween. As a result, the entire hysteresis torque is increased, and the fine torsional vibrations are transmitted to the transmission side without being absorbed by the clutch disc assembly, whereby a clack sound is liable to be generated in the transmission.

There also exists a clutch disc assembly of the separation type in which the conventional flange is separated from the hub to form a separated flange, and the separated flange and the hub are coupled to each other by a low-rigidity elastic member. In the clutch disc assembly of this type, a relative twist angle between the input plates and the hub is increased, and the clutch disc assembly exhibits two steps or levels of torsional characteristics, one level having a low rigidity and the second level having high rigidity.

In the friction generation mechanism, between one input plate and the respective separated flanges, the flange portion of the hub are disposed friction members which abut against the respective flanges and pressing members that presses the respective friction members against the corresponding flange portions. On the other hand, the bushing is relatively non-rotatably fitted to the inner peripheral end of the clutch plate. The bushing is abutted against the side surfaces of both the flanges. Also, the bushing is abutted against the outer peripheral surface of a boss, to thereby radially position the input plate and the hub.

In the above-mentioned separated-hub type clutch disc assembly, for example, there is a case in which the input plate is off-center with respect to the hub. In this case, an unbalanced load is developed between the outer peripheral surface of the hub and the bushing. As a result, the hysteresis torque in a range where the twist angle is small is increased, whereby the fine torsional vibrations cannot be effectively attenuated.

SUMMARY OF THE INVENTION

One object of the present invention is to solve the above-mentioned problems. For instance, one object of the present invention is to provide a clutch disc assembly in which, even when the transmission input shaft and the engine flywheel are misaligned, the hysteresis torque produced when the fine torsional vibrations generally the same as where there is an absence of misalignment.

Another object of the present invention is to provide a clutch disc assembly having a support mechanism that positions a hub and input plates radially with respect to each other so that the hub is movable with respect to the input plates, which is capable of reducing the eccentricity of the input plates and the hub at the time of engaging the clutch.

In one aspect of the present invention, a clutch disc assembly includes a hub and an annular friction disc member coupled to the hub for limited relative rotation therewith. An elastic member is disposed between the hub and the annular friction disc member elastically coupling the hub and the annular friction disc member. A friction generating mechanism is also disposed between the hub and the annular friction disc member for producing friction in response to relative rotary displacement between the hub and the annular friction disc member. The friction generating mechanism is configured to allow for slight misalignment between the hub and the annular friction disc member and produce a generally constant level of friction in response to relative rotary displacement between the hub and the annular friction disc member in the presence of misalignment between the hub and the annular friction disc member.

In another aspect of the present invention, a clutch disc assembly includes a hub and an annular friction disc member coupled to the hub for rotation therewith, the annular friction disc member formed with a tapered surface on an outer circumferential portion thereof. A disc-shaped plate member is disposed adjacent to an outer periphery of the hub, the disc-shaped plate member having a tapered inner peripheral edge abutted against the tapered surface of the annular friction disc member. An elastic member is disposed between a portion of the disc-shaped plate member and the hub, the elastic member coupling the hub to the disc-shaped plate member in a circumferential direction for limited relative rotary displacement.

Preferably, a flange member is disposed about the hub and a second elastic member is disposed between the hub and the flange coupling the hub and the flange for limited relative rotary displacement. Further, the elastic member couples the flange and the disc-shaped plate member for limited relative rotary displacement.

Preferably, the annular friction disc member at least partially defines a friction generating mechanism for creating friction in response to relative rotation between the disc-shaped plate member and the hub, the flange and the hub and the flange and the disc-shaped plate member.

In another aspect of the present invention, a clutch disc assembly includes a hub having a flange connected to an outer periphery thereof and a clutch plate having a center hole into which the hub is fitted. An elastic member couples the flange to the clutch plate in a circumferential direction. An annular friction coupling member is fixed onto the outer periphery of the clutch plate for engagement with a flywheel. A support mechanism is disposed between the inner peripheral portion of the clutch plate and outer peripheral portion of the hub for positioning the clutch plate and the hub radially so that the hub is movable with respect to the clutch plate to accommodate a misalignment between the clutch plate and the hub. Further, an urging member is disposed between the inner peripheral portion of the clutch plate and the hub, for urging the clutch plate and the hub radially with respect to one another, thus urging the hub toward a concentric position with respect to the clutch plate.

Preferably, the urging member includes an annular portion and a plurality of axially extending urging portions which extend from the annular portion and which are circumferentially arranged on the annular portion, the urging portions extending between the clutch plate and the hub.

Preferably, the clutch disc assembly further includes a second elastic member disposed between the hub and the flange, the second elastic member being compressible in response to limited rotary displacement between the hub and the flange.

Preferably, the urging member includes an annular portion and a plurality of axially extending urging portions which extend from the annular portion and which are circumferentially arranged on the annular portion, the urging portions extending between the clutch plate and the hub, the urging member further formed with a plurality of claws which extend axially from the annular portion and extend between the hub and the flange.

Preferably, the annular portion is formed with an inner tapered surface and an outer tapered surface and the support mechanism includes a first friction washer which abuts the hub. A second friction washer is attached to the clutch plate, and the inner tapered surface engages the first friction washer and the outer tapered surface engages the second friction washer.

Preferably, the first friction washer is formed with a tapered surface corresponding to the inner tapered surface and the second friction washer is formed with a tapered surface corresponding to the outer tapered surface.

Preferably, the inner and outer tapered surfaces have a conical contour.

In a further aspect of the present invention, a clutch disc assembly includes a hub formed with a flange which extends radially outwardly from the hub and a rotary disc member having a center hole into which the hub is rotatably inserted. An intermediate disc member is disposed about the flange concentric with both the flange and the rotary disc member. A first elastic member is disposed between the intermediate disc member and the flange elastically coupling the intermediate disc member and the flange in a circumferential direction. A second elastic member is disposed between the rotary disc member and the intermediate disc member elastically coupling the rotary disc member and the intermediate disc member in a circumferential direction, the second elastic member being more rigid than the first elastic member. Further, the clutch disc assembly includes a bushing that includes a first annular member which abuts the hub and the flange and a second annular member which is non-rotatably engaged with the center hole and disposed radially on the outer peripheral side of the first annular member with a gap. The clutch disc assembly further includes an urging member which is disposed between the first annular member and the second annular member, for urging the first and second annular members towards a concentric orientation.

Preferably, the urging member is a leaf spring;

Preferably, the urging member includes a plurality of elastic elements arranged circumferentially about the first annular member.

Preferably, the second annular member has a plurality of protrusions which are arranged in a circumferential direction and protrude radially inwardly, and each of the urging members is retained between an adjacent pair of the protrusions.

Preferably, the clutch disc assembly further includes: a hysteresis generation mechanism which has a first friction washer which abuts against the intermediate disc member and which is non-rotatably engaged with the second annular member; a drive washer which abuts against the first friction washer and which is rotatably engaged with the intermediate disc member; a second friction washer disposed between the drive washer and the rotary disc member; and an urging member for urging the intermediate disc member and the rotary disc member toward one another.

In yet another aspect of the present invention, a clutch disc assembly includes a hub having a flange which extends radially outwardly from the hub and a rotary disc member having a center hole into which the hub is rotatably inserted. An intermediate disc member is disposed about the flange concentric with both the flange and the rotary disc member. A first elastic member couples the intermediate disc member to the flange in a circumferential direction. A second elastic member couples the rotary disc member to the intermediate disc member in a circumferential direction, the second elastic member being more rigid than the first elastic member. A hysteresis torque generation mechanism is disposed between the rotary disc member and the intermediate disc member and includes a plurality of friction members having a plurality of friction surfaces. Bushings are fixed to the inner periphery of the rotary disc member so as to be abutted against the hub for axially holding the inner peripheral portions of the plurality of friction members therebetween.

Preferably, the hysteresis torque generation mechanism includes: a first friction washer which abuts the intermediate disc member and rotates integrally together with the rotary disc member; a drive washer which is relatively non-rotatably engaged with the intermediate disc member and which is abutted against the first friction washer; a second friction washer which is retained between the drive washer and the rotary disc member; and an urging member for urging said rotary disc member and the intermediate disc member toward one another. Further, the bushings axially hold both the inner peripheral portions of the rotary disc member and the first friction washer therebetween.

Preferably, the bushing includes a first annular member which is engaged with the first friction washer, and a second annular member which is disposed on the outer peripheral side of the first annular member and which is engaged with the rotary disc member.

Preferably, the first annular member and the second annular member have engaging portions that limit the relative rotation therebetween.

Preferably, the engaging portions include a plurality of recesses which are formed on one of the first and second annular members and opened toward the other annular member, and a plurality of protrusions which are formed on the other of the first and second annular members so as to protrude radially, and which are inserted into the recesses.

Preferably, the first annular member includes: a disc portion which abuts the flange and abuts the first friction washer adjacent to the intermediate disc member; a cylindrical portion which extends from the inner peripheral edge of the disc portion and which is abutted against the outer peripheral surface of the hub; and a first abutting portion which extends from the tip of the cylindrical portion radially outwardly and which holds the second annular member between the first abutting portion and the disc portion. Further, the second annular member has a second abutting portion which abuts the inner peripheral portion of the rotary disc member opposite the intermediate disc member.

Preferably, the first friction washer has an inner peripheral portion thereof that is non-rotatably engaged with the second annular member.

Preferably, the first annular member has a lower friction coefficient than the second annular member.

Preferably, the second annular member is higher in strength than the first annular member.

In yet another aspect of the present invention, a clutch disc assembly includes a hub having a flange which extends radially outwardly from the hub and a rotary disc member having a center hole into which the hub is rotatably inserted. An intermediate disc member is disposed about the flange adjacent to the rotary disc member. A first elastic member couples the intermediate disc member to the flange in a circumferential direction. A second elastic member couples the rotary disc member to the intermediate disc member in a circumferential direction and which is more rigid than the first elastic member. The clutch disc assembly also includes a hysteresis generation mechanism. The hysteresis generation mechanism includes: a first friction washer which abuts the intermediate disc member; a drive washer which non-rotatably abuts against the intermediate disc member and which is engaged with the first friction washer; a second friction washer disposed between the drive washer and the rotary disc member; and an urging member for urging the rotary disc member and the intermediate disc member so as to approach each other; and bushings which are fixed to the inner periphery of the rotary disc member so as to abut against the hub and which is relatively non-rotatably engaged with said first friction washer.

In the case where the transmission shaft is misaligned or inclined radially with respect to the clutch disc assembly, the configuration of the present invention allows for the hub to move with the shaft. Due to the misalignment, an unbalanced load is applied from the inner peripheral edge of the disc-shaped plate member to the tapered surface. However, the unbalanced load is dispersed by the tapered surface and therefore, the friction generated between the disc-shaped plate member and the hub during relative rotation is not increased. In other words, the hysteresis torque is not substantially affected by misalignment. Therefore, there is an effective attenuation the fine torsional vibrations.

These and other objects, features, aspects and advantages of the present invention will become more fully apparent from the following detailed description of the present invention when taken in conjunction with the accompanying drawings where like reference numerals denote corresponding parts throughout, in which:

BRIEF DESCRIPTION OF THE DRAWINGS

FIG. 1 is a section taken along the line I—I in FIG. 2;

FIG. 11 is a section taken along the line XI—XI in FIG. 12;

FIG. 17 is a cross-sectional view taken along a line XVII—XVII in FIG. 16, looking in the direction of the arrows;

FIG. 21 is taken along the line XXI—XXI in FIG. 22, looking in the direction of the arrows;

DETAILED DESCRIPTION OF THE PREFERRED EMBODIMENTS

First Embodiment

Figure 1:
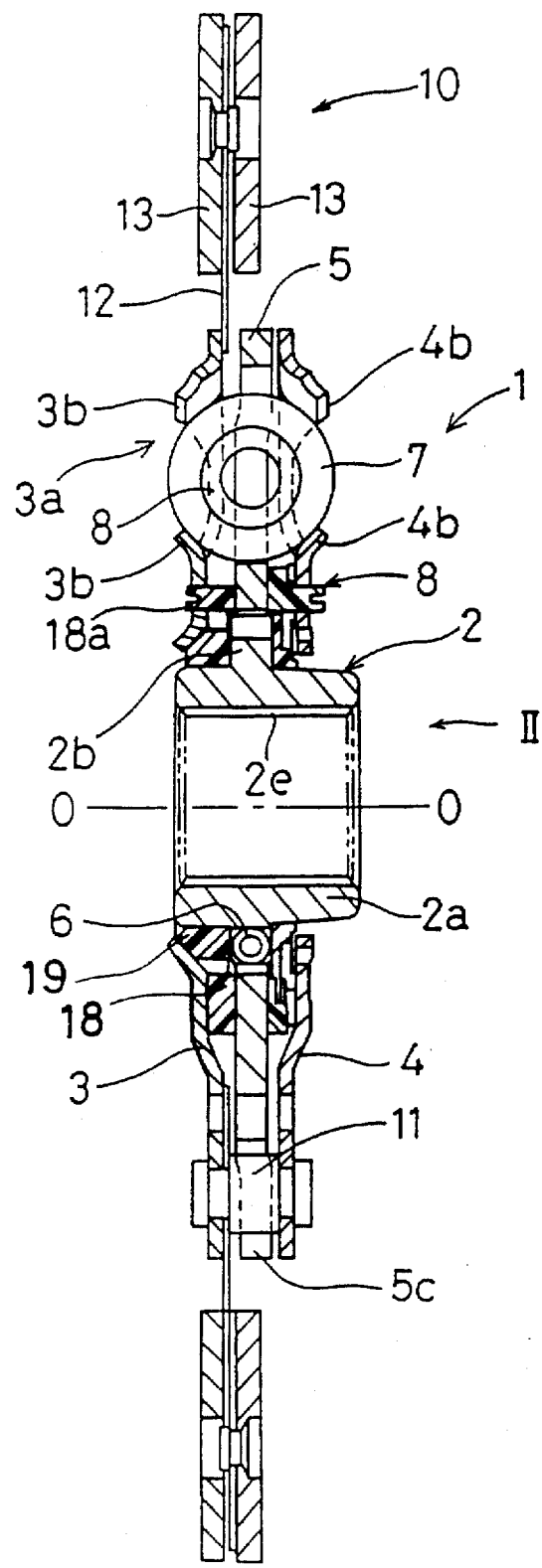
FIG. 1 is a side cross-sectional view showing a clutch disc assembly in accordance with a first embodiment of the present invention.

FIG. 1 shows a clutch disc assembly 1 in accordance with a first embodiment of the present invention. The clutch disc assembly 1 is a unit for transmitting torque from an engine (not shown) disposed at the left side of FIG. 1 to or from a transmission (not shown) disposed at the right side of FIG. 1. A line 0—0 in FIG. 1 represents a rotary axis line of the clutch disc assembly 1.

The clutch disc assembly 1 is mainly made up of a hub 2 acting as an output member, a clutch plate 3 as well as a retaining plate 4 acting as an input member, a sub-plate 5 acting as an intermediate member, small coil springs 6 disposed between the sub-plate 5 and the hub 2 so as to limit the relative rotation of the sub-plate 5 and the hub 2, large coil springs 7 disposed between the plates 3, 4 and the sub-plate 5 so as to limit the relative rotation of the plates 3, 4 and the sub-plate 5, and a frictional resistance generation mechanism 8 for generating a predetermined friction force when the relative rotation is generated between the plates 3, 4 and the hub 2.

Figure 3:
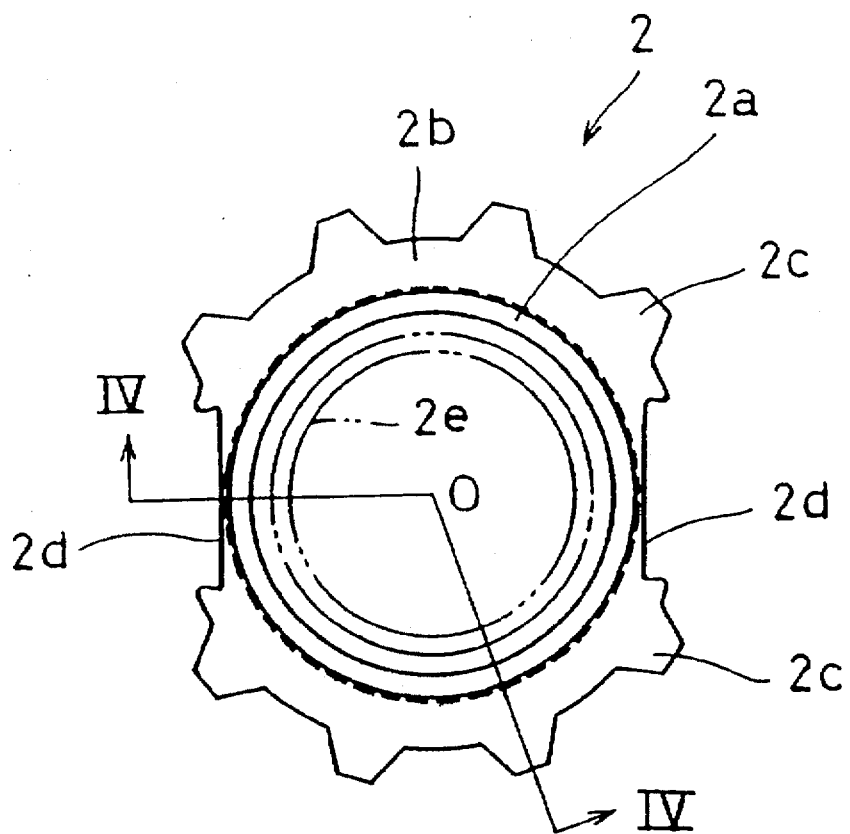
FIG. 3 is a plan view of a hub shown removed from the clutch disc assembly depicted in FIGS. 1 and 2.
Figure 4:
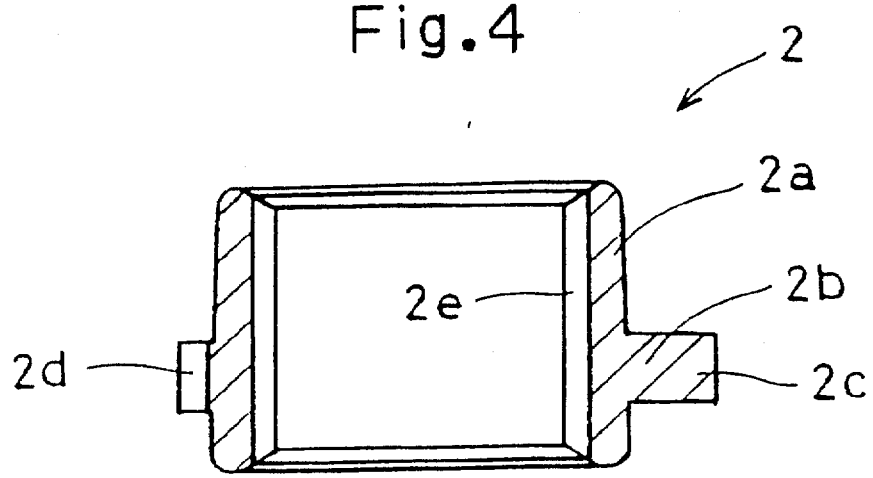
FIG. 4 is a cross-sectional view of the hub taken along a line IV—IV in FIG. 3 looking in the direction of the arrows.

The hub 2 is disposed in the center of the clutch disc assembly 1 and coupled to a shaft (not shown) of the transmission. The hub 2 is made up of a cylindrical boss 2a extending axially and a flange 2b integrally formed in the outer periphery of the boss 2a. A plurality of protrusions 2c are formed in the outer periphery of the flange 2b in a circumferential direction at regular intervals. As shown in FIG. 3, cutaways 2d are so defined as to receive both ends of the small coil spring 6 in a circumferential direction (described below) at two locations which are radially opposed to each other on the flange 2b. Also, a spline hole 2e which is spline-engaged with the shaft (not shown) of the transmission is defined on the inner peripheral side of the boss 2a.

Figure 2:
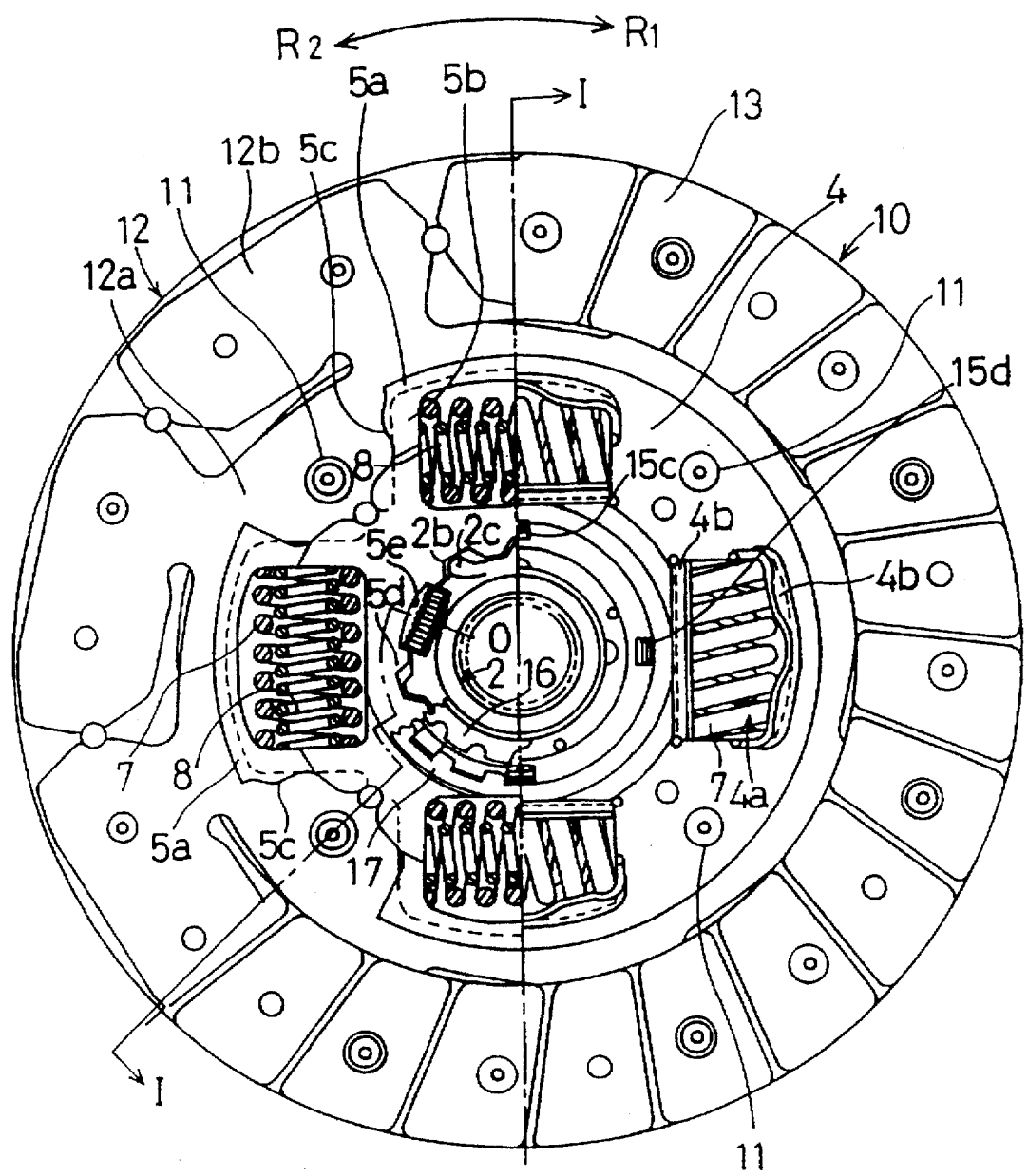
FIG. 2 is a part elevation, part cutaway rear end view of the clutch disc assembly shown in FIG. 1, looking in the direction of the arrow II in FIG. 1, where

The sub-plate 5, shown in FIG. 2, is disposed in the outer periphery of the flange 2b of the hub 2. The sub-plate 5 is formed of a disc-shaped plate. The sub-plate 5, as is apparent from FIG. 2, includes four protruding portions 5a extending radially outwardly. A window hole 5b that extends in a circumferential direction is defined in each of the protruding portions 5a.

An outer cutaway 5c is defined between the respective protruding portions 5a. Inner protrusions 5d are formed at corresponding portions between the respective protrusions 2c of the hub 2 on the inner peripheral side of the sub-plate 5. A predetermined gap is ensured between each protrusion 2c and each inner protrusion 5d in a circumferential direction, thereby allowing limited relative rotation between the hub 2 and the sub-plate 5 by a predetermined angle.

Inner cutaways 5e are defined at two locations corresponding to the cutaways 2d of the hub 2 on the inner peripheral side of the sub-plate 5. The small coil spring 6 is disposed between the cutaway 2d and the inner cutaway 5e.

Seat members 6a are disposed on both ends of the small coil spring 6 in such a manner that the seat members 6a are abutted against the side portion of the cutaway 2d and both ends of the inner cutaway 5e in a circumferential direction. It should be noted that the protrusion 2c is disposed at the side of R2 between the respective inner protrusions 5d in a neutral state shown in FIG. 2.

The clutch plate 3 and the retaining plate 4 are disposed on opposite sides of the sub-plate 5. The clutch plate 3 and the retaining plate 4 form a pair of nearly disc-shaped members which are rotatably disposed on the outer peripheral side of the boss 2a of the hub 2. The clutch plate 3 and the retaining plate 4 are fixed to each other by abutting pins 11 at the outer peripheral portion thereof. The abutting pins 11 are inserted into the outer cutaways 5c formed in the sub-plate 5. Because the abutting pins 11 and the cutaways 5c are ensured with predetermined gaps in a circumferential direction, the plates 3, 4 and the sub-plate 5 are rotatable relatively. On the inner peripheral edge of the clutch plate 3 is formed a tapered portion 3c that protrudes axially outwardly.

A friction coupling portion 10 is disposed along the outer periphery of the clutch plate 3. The friction coupling portion 10 is mainly made up of an annular cushioning plate 12 and friction facings 13. The cushioning plate 12 has an annular portion 12a which is fixed to the clutch plate 3 by the abutting pins 11. On the outer peripheral side of the cushioning plate are formed a plurality of cushioning portions 12b. The friction facings 13 are fixed to opposite surfaces of the cushioning portions 12b.

The clutch plate 3 and the retaining plate 4 have window holes 3a and 4a formed at positions corresponding to the window holes 5b of the sub-plate 5, respectively. The large coil springs 7 are disposed within the window holes 3a and 4a. Retaining portions 3b and 4b, which are cut and elected axially outwardly, are formed on both sides of the respective window holes 3a and 4a radially.

The number of the large coil springs is 4 in total, which are received within each of the window holes 5b one by one. A small-diameter coil spring 8 is disposed within each of the large coil springs 7. Both of circumferential ends of the springs 7 and 8 are abutted against both of circumferential ends of the window holes 5b, 3a and 4a.

The large coil springs 7 as described above are limited in movements radially outwardly as well as axially by the retaining portion 4b of the retaining plate 4 and the retaining portion 3b of the clutch plate 3.

Four holes which are engaged with parts of the frictional resistance generation mechanism 8 (described below) are formed in a circumferential direction at regular intervals on the inner peripheral sides of the clutch plate 3 and the retaining plate 4.

Subsequently, the frictional resistance generation mechanism 8 will be described.

The frictional resistance generation mechanism 8 is made up of a plurality of annular members disposed on the outer peripheral side of the boss 2a between the inner peripheral portion of the clutch plate 3 and the inner peripheral portion of the retaining plate 4 axially. The members constituting the frictional resistance generation mechanism 8 are a first friction washer 14, a second friction washer 15, a first cone spring 16, a second cone spring 17, a third friction washer 18 and a fourth friction washer 19.

Figure 5:
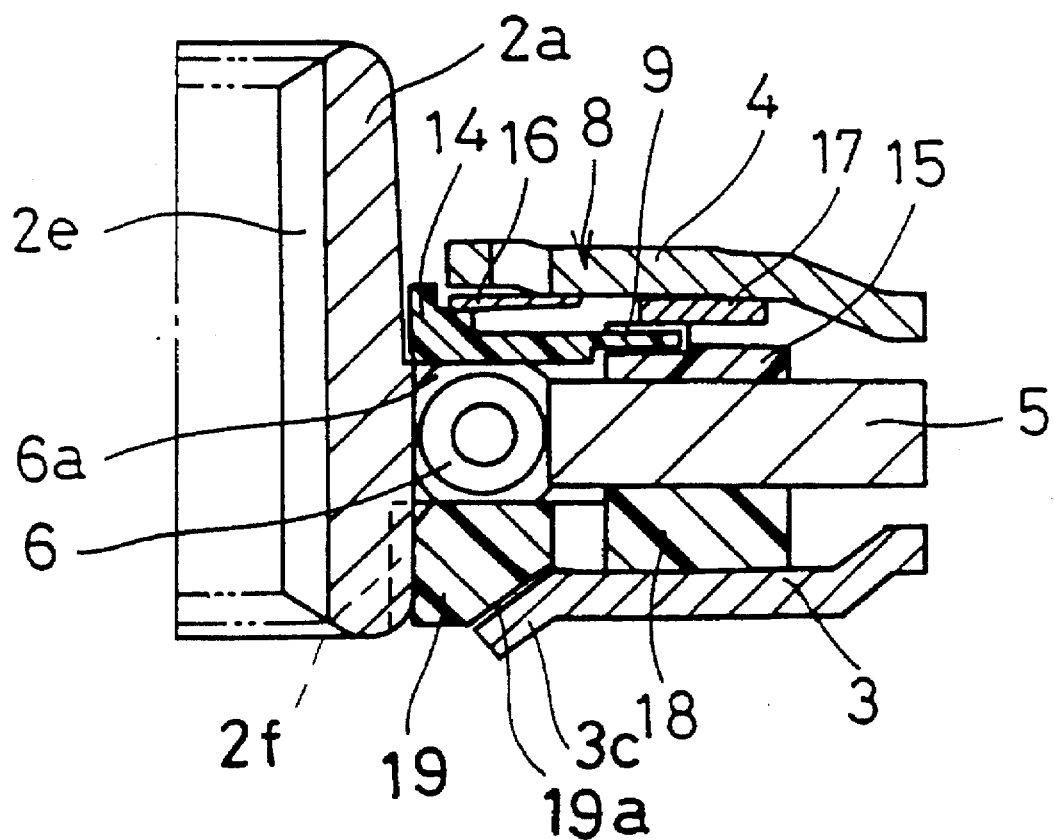
FIG. 5 is a fragmentary view of a portion of FIG. 1, shown on a slightly enlarged scale.
Figure 6:
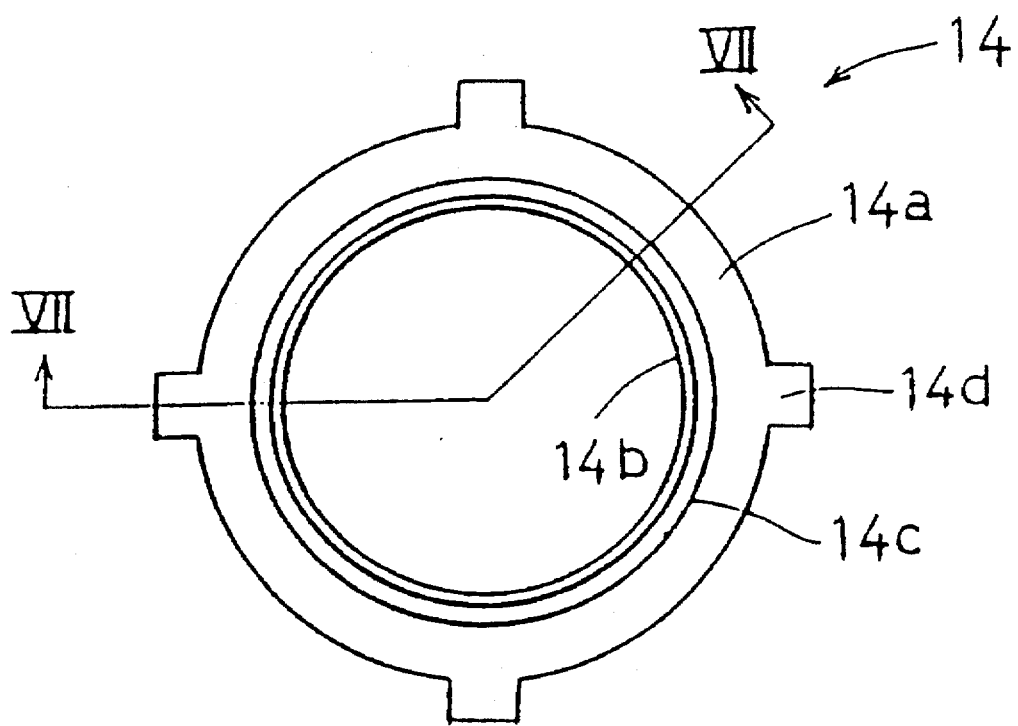
FIG. 6 is a plan view showing a first friction washer shown removed from the clutch disc assembly depicted in FIGS. 1 and 2.
Figure 7:
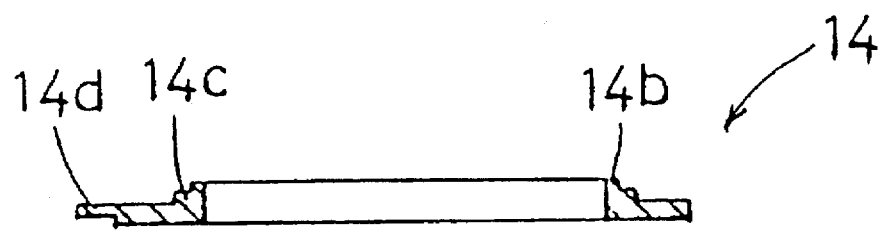
FIG. 7 is a cross-sectional view of the first friction washer taken along a line VII—VII in FIG. 6 looking in the direction of the arrows.

The first friction washer 14 is formed of a resin disc-shaped plate. The first friction washer 14 has an inner peripheral end which is close to the boss 2a, as shown in FIGS. 5 to 7, and one side surface which is abutted against the flange 2b of the hub 2 and the side surfaces of the protrusions 2c at the transmission side. The first friction washer 14 has a disc portion 14a and an annular protrusion portion 14b protruding from the inner peripheral side of the disc portion 14a toward the transmission side. The annular protrusion portion 14b has an annular cutaway groove 14c formed at the transmission side. Also, four protrusions 14d that extend radially outwardly are formed in the outer periphery of the disc portion 14a.

The first cone spring 16 is disposed axially between the first friction washer 14 and the retaining plate 4. The first cone spring 16 has its outer peripheral end supported by the retaining plate 4 and its inner peripheral end abutted against the annular cutaway groove 14c which is formed on the annular protrusion portion 14b of the first friction washer 14. The first cone spring 16 is disposed in a compressed state and urges the first friction washer 14 toward the flange 2b and the protrusion 2c of the hub 2. A plurality of cutaways are defined on the outer peripheral side of the first cone spring 16. The cutaways are formed to reduce changes in the urging force of the first cone spring 16 that can occur as the first friction washer 14 experiences wear.

Figure 8:
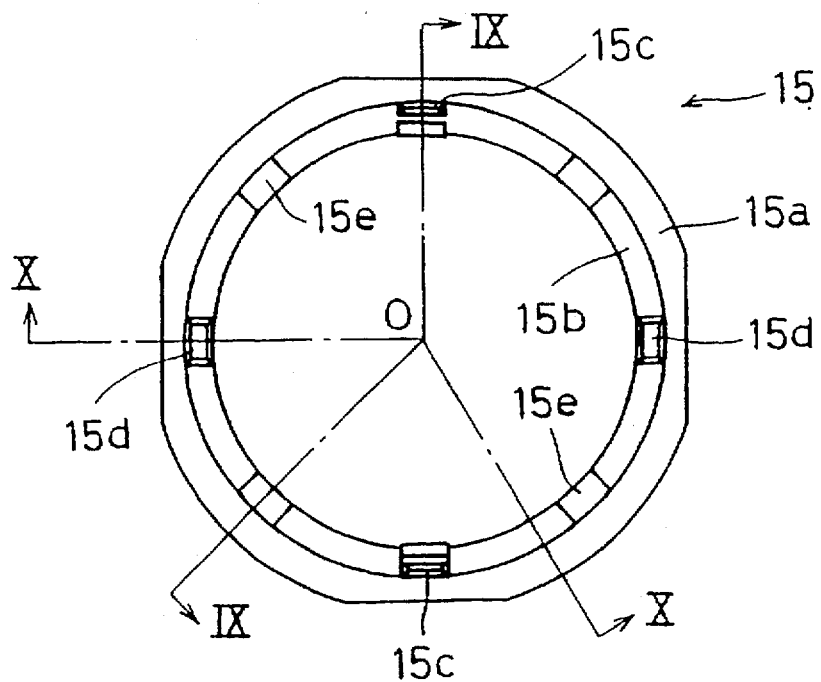
FIG. 8 is a plan view showing a second friction washer shown removed from the clutch disc assembly depicted in FIGS. 1 and 2.
Figure 9:
FIG. 9 is a cross-sectional view of the second friction washer taken along the line IX—IX in FIG. 8.
Figure 10:
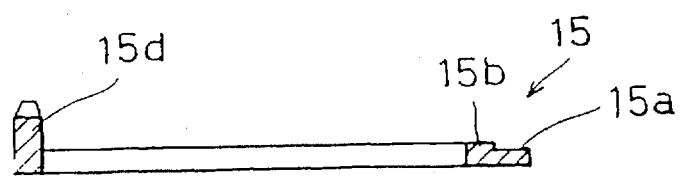
FIG. 10 is a cross-sectional view of the second friction washer taken along the line X—X in FIG. 8.

The second friction washer 15 is, as is apparent from FIGS. 8 to 10, formed of a disc-shaped member, and is substantially flush with a plane on which the first friction washer 14 is disposed and concentric with the first friction washer 14 on the outer peripheral side of the first friction washer 14. The second friction washer 15 is made up of a disc member 15a and an annular protrusion portion 15b that protrudes toward the transmission side on the inner peripheral side of the disc member 15a. The engine end surface of the disc member 15a is abutted against the inner peripheral end surface of the sub-plate 5. Four cutaways 15e are formed at regular intervals in a circumferential direction on the end surface of the annular protrusion portion 15b at the transmission side.

The protrusion 14d of the first friction washer 14 is engaged with the inside of each cutaway 15e in such a manner that the former is not rotatable in a circumferential direction but may move axially with respect thereto. It should be noted that a predetermined gap is ensured axially between the protrusion 14d and the recess 15e. Four protrusions that extend toward the transmission side are formed on the annular protrusion portion 15b between the portion 15b and the recess 15e. Those protrusions is formed of two snap protrusions 15c and two bar-shaped protrusions 15d. In this example, the protrusions of the same sort are opposed to each other radially. The snap protrusion 15c is divided into two pieces by a slit extending axially, and has a hook-shaped snap at its tip. The snap protrusion 15c is inserted into a hole formed in the retaining plate 4. It should be noted that the second friction washer 15 is hard to detach from the retaining plate 4 axially due to the snap protrusion 15c. The bar-shaped protrusion 15d is inserted into a hole of the retaining plate 4.

The second cone spring 17 is disposed axially between the second friction washer 15 and the retaining plate 4. A plurality of cutaways are defined on the inner peripheral side of the second cone spring 17. The cutaways are formed to reduce possible changes in the urging force of the second cone spring 17 when the second friction washer 15 experiences wear. The second cone spring 17 is disposed in a compressed state. The second cone spring 17 has its outer peripheral end abutted against the retaining plate 4 and its inner peripheral end, that is, a protrusion (not shown) abutted against the side surface of the annular protrusion portion 15b of the second friction washer 15 at the transmission side. In this way, the second cone spring 17 urges the second friction washer 15 toward the side surface of the sub plate 5 at the transmission side. In this situation, the urging force of the second cone spring 17 is set to be larger than that of the first cone spring 16. It should be noted that the cutaway portion (not shown) of the second cone spring 17 is associated with the snap protrusion 15c, the bar-shaped protrusion 15d and the recess 15e of the second friction washer 15 in such a manner that the second cone spring 17 does not mutually interfere with those members.

The third friction washer 18 is disposed axially between the inner peripheral portion of the clutch plate 3, the flange 2b of the hub 2, and the inner peripheral end of the sub-plate 5 (see FIG. 5). The third friction washer 18 has a side surface of the transmission side which is abutted against the side surface of the inner peripheral end portion of the sub-plate 5 and a side surface of the engine side which is abutted against the clutch plate 3. A snap protrusion 18a (see FIG. 1) extending axially toward the engine side is formed on the third friction washer 18. The snap protrusion 18a is fitted into a hole defined in the clutch plate 3. The snap protrusion 18a is of the same shape as that of the snap protrusion 15c of the second friction washer 15 as described above.

The fourth friction washer 19 is fitted to a slit 2f defined in the boss 2a in such a manner that it is axially movable but radially non-rotatable relatively. The fourth friction washer 19 is abutted against the flange 2b. Also, the fourth friction washer 19 has a tapered surface 19a at the engine side. The tapered portion 3c of the clutch plate 3 is disposed adjacent to the tapered surface 19a.

In assembling the clutch disc assembly 1 described above, the first friction washer 14, the second friction washer 15, the first cone spring 16, and the second cone spring 17 in the frictional resistance generation mechanism 8 are assembled with the retaining plate 4 into a sub-assembly in advance. This assembling work can be simply performed by merely inserting the protrusion 15c of the second friction washer 15 into the hole 4c of the retaining plate 4. The second friction washer 15 is so designed as to prevent the first friction washer 14, the first cone spring 16 and the second cone spring 17 from falling off of the retaining plate 4. With the above members being thus formed into the sub-assembly, the respective members before being completely assembled can be managed in a sub-assembly state, thereby being capable of facilitating the work. Also, the working efficiency at the time of completely assembling the respective members is remarkably improved owing to the sub-assembly. It should be noted that the third friction washer 18 is similarly assembled with the clutch plate 3 into a sub-assembly in advance.

The shaft of the transmission is insertable into the clutch disc assembly 1 from the right side of FIG. 1 with respect to the clutch disc assembly 1. The shaft (not shown) is fitted into the spline hole 2e defined on the inner peripheral side of the boss 2a. In this situation, it is assumed that the shaft is slightly inclined from the just center axis line 0—0. In the case where misalignment is thus made, the hub 2, the third friction washer 18 and the fourth friction washer 19 movably follow the shaft. In this situation, the tapered portion 3c of the clutch plate 3 is abutted against the tapered surface 19a of the fourth friction washer 19. As a result, an unbalanced load is applied from the clutch plate 3 to the fourth friction washer 19.

Upon allowing the friction facing 13 to be pushed on the flywheel (not shown) at the engine side, a torque of the engine flywheel is inputted to the clutch plate 3 and the retaining plate 4. The torque is transmitted to the hub 2 through the large coil spring 7, the coil spring 8, the sub-plate 5 and the small coil spring 6, and further transmitted to the shaft of the transmission side not shown.

Upon the transmission of torsional vibrations from the engine flywheel (not shown) to the clutch disc assembly 1, the relative rotation is periodically conducted between the plates 3, 4 and the hub 2, whereby the respective springs 6, 7 and 8 are compressed, and a friction is produced by the frictional resistance generation mechanism 8. In this situation, a hysteresis is generated in relation between the twist angle and the torsional torque.

In a range where the twist angle is small, the small coil spring 6 is compressed in a circumferential direction, and the first friction washer 14 and the third friction washer 18 slide with respect to the flange 2b of the hub 2. Also, in the case where misalignment is made, the tapered portion 3c of the clutch plate 3 frictionally slides on the tapered surface 19a of the fourth friction washer 19. However, the unbalanced load exerted on the fourth friction washer 19 is dispersed by the tapered surface 19a so that a force vertically exerted on the tapered surface 19a is small. For that reason, the friction developed on the tapered surface 19a becomes small. In this situation, the characteristics of the low rigidity and the low hysteresis torque permit the torsional vibrations small in a displacement angle to be effectively attenuated.

In a range where the twist angle is large, the small coil spring 6 is compressed so that the sub-plate 5 and the hub 2 are integrally rotated, whereby the relative rotation is conducted between those members and the plates 3, 4. In this situation, the large coil spring 7 and the coil spring 8 are compressed, the first friction washer 14 slides together with the flange 2b of the hub 2, the second friction washer 15 slides on the inner peripheral side surface of the sub-plate 5, and further the third friction washer 18 slides on the flywheel side surface of the inner peripheral surface of the sub-plate 5. In this embodiment, because the urging force of the second cone spring 17 is set to be larger than the urging force of the first cone spring 16, a large friction force is generated. In this situation, the characteristics of the high rigidity and the high hysteresis allow the torsional vibrations large in the displacement angle to be effectively attenuated.

As described above, since an appropriate characteristic is obtained depending on the sort of the torsional vibrations, the clutch disc assembly 1 is effective to attenuate the torsional vibrations.

Second Embodiment

Figure 11:
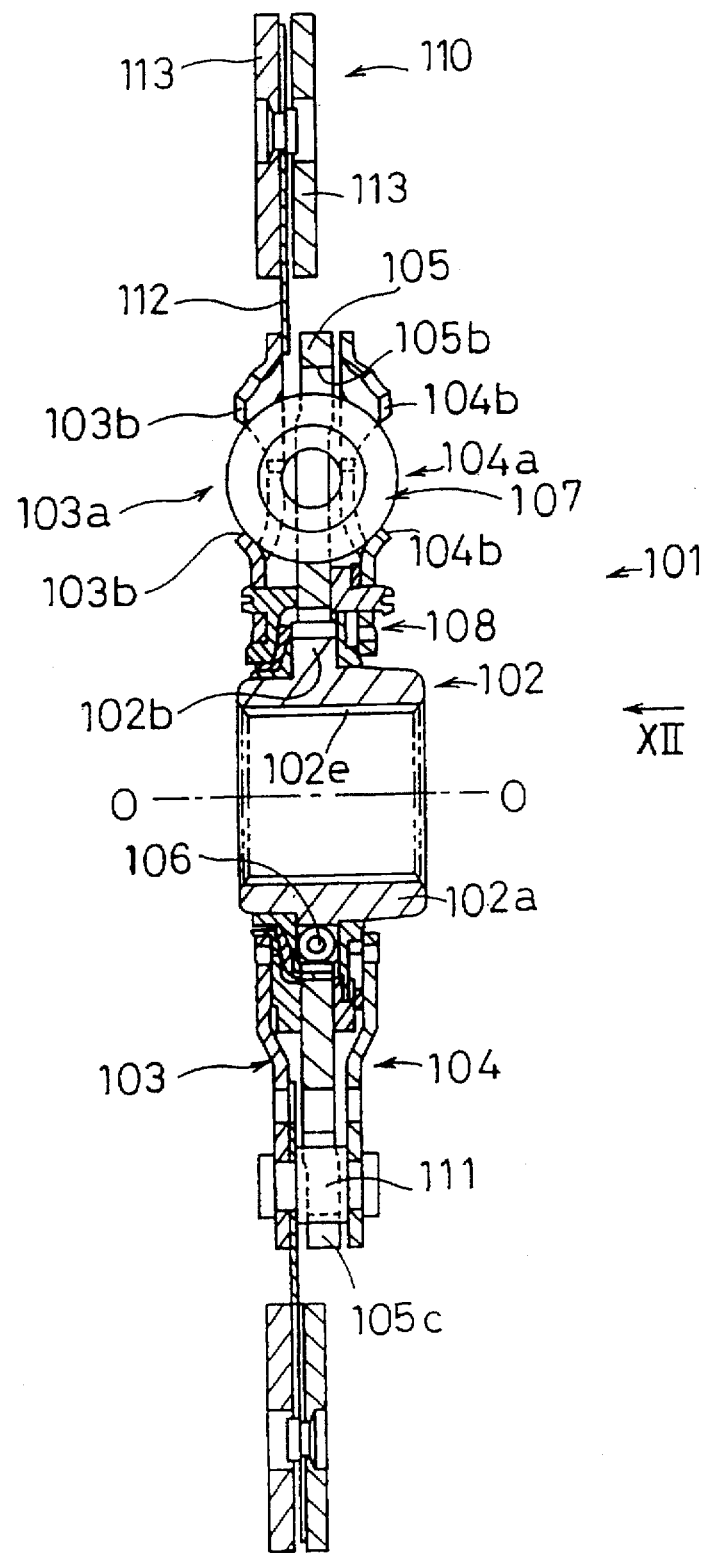
FIG. 11 is a side cross-sectional view showing a clutch disc assembly in accordance with a second embodiment of the present invention.
Figure 12:
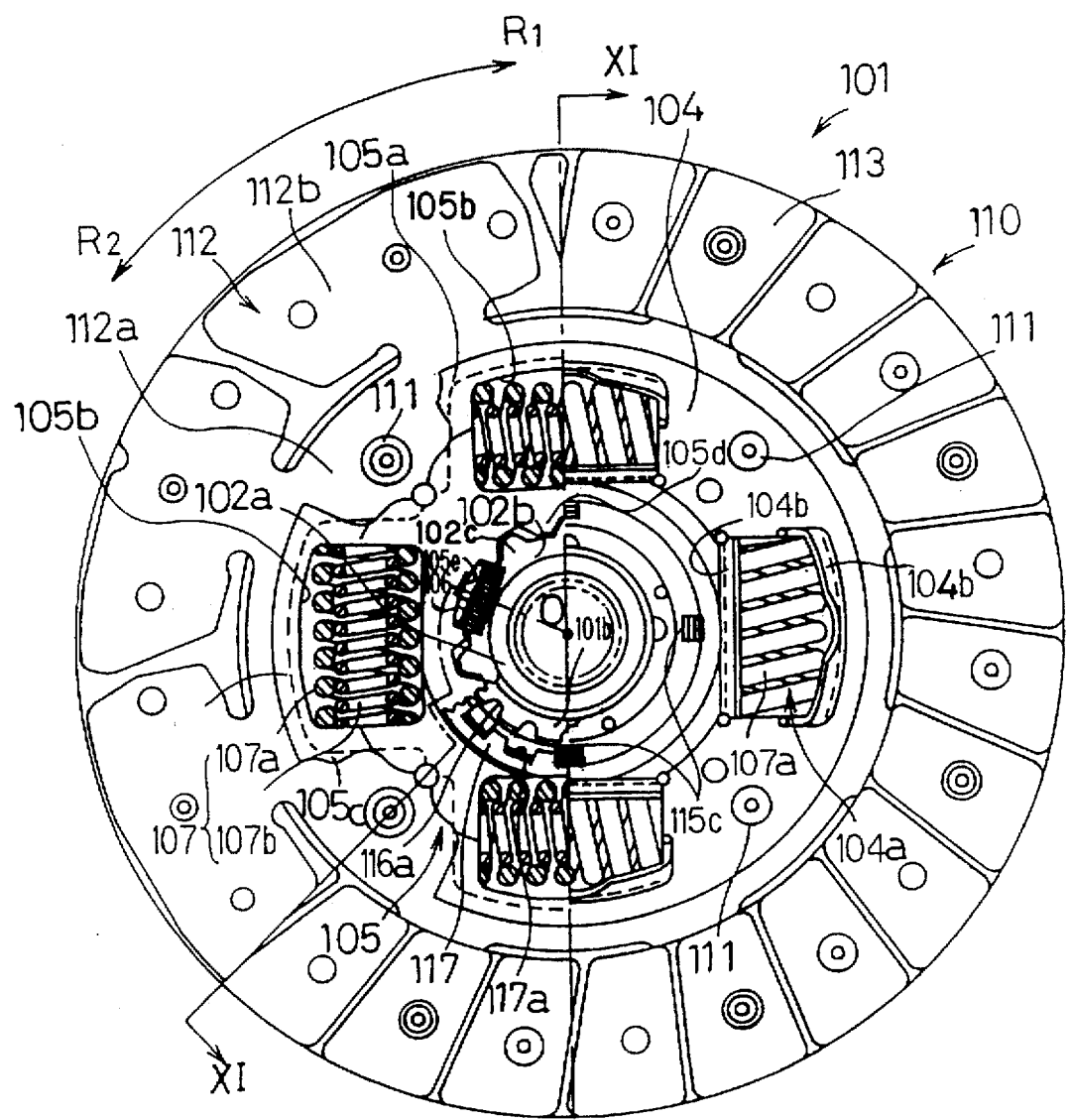
FIG. 12 is a part elevation, part cutaway rear end view of the clutch disc assembly shown in FIG. 11, looking in the direction of the arrow XII in FIG. 11, where

A second embodiment of the present invention is shown in FIGS. 11–20. FIG. 11 shows a clutch disc assembly 101 in accordance with the second embodiment of the present invention. The clutch disc assembly 101 is a unit for transmitting torque from an engine (not shown) disposed at the left side of FIG. 11 to or from a transmission (not shown) disposed at the right side of FIG. 11. A line 0—0 in FIG. 11 represents a rotary axis line of the clutch disc assembly 101.

The clutch disc assembly 101 is mainly made up of a hub 102 acting as an output member, a clutch plate 103 as well as a retaining plate 104 acting as an input member, a sub-plate 105 acting as an intermediate member, a first coil spring 106 disposed between the sub-plate 105 and the hub 102 so as to limit the relative rotation of the sub-plate 105 and the hub 102, a second coil springs 107 disposed between the plates 103, 104 and the sub-plate 105 so as to limit the relative rotation of the plates 103, 104 and the sub-plate 105, and a frictional resistance generation mechanism 108 for generating a predetermined friction force when the relative rotation is generated between the plates 103, 104 and the hub 102.

Figure 13:
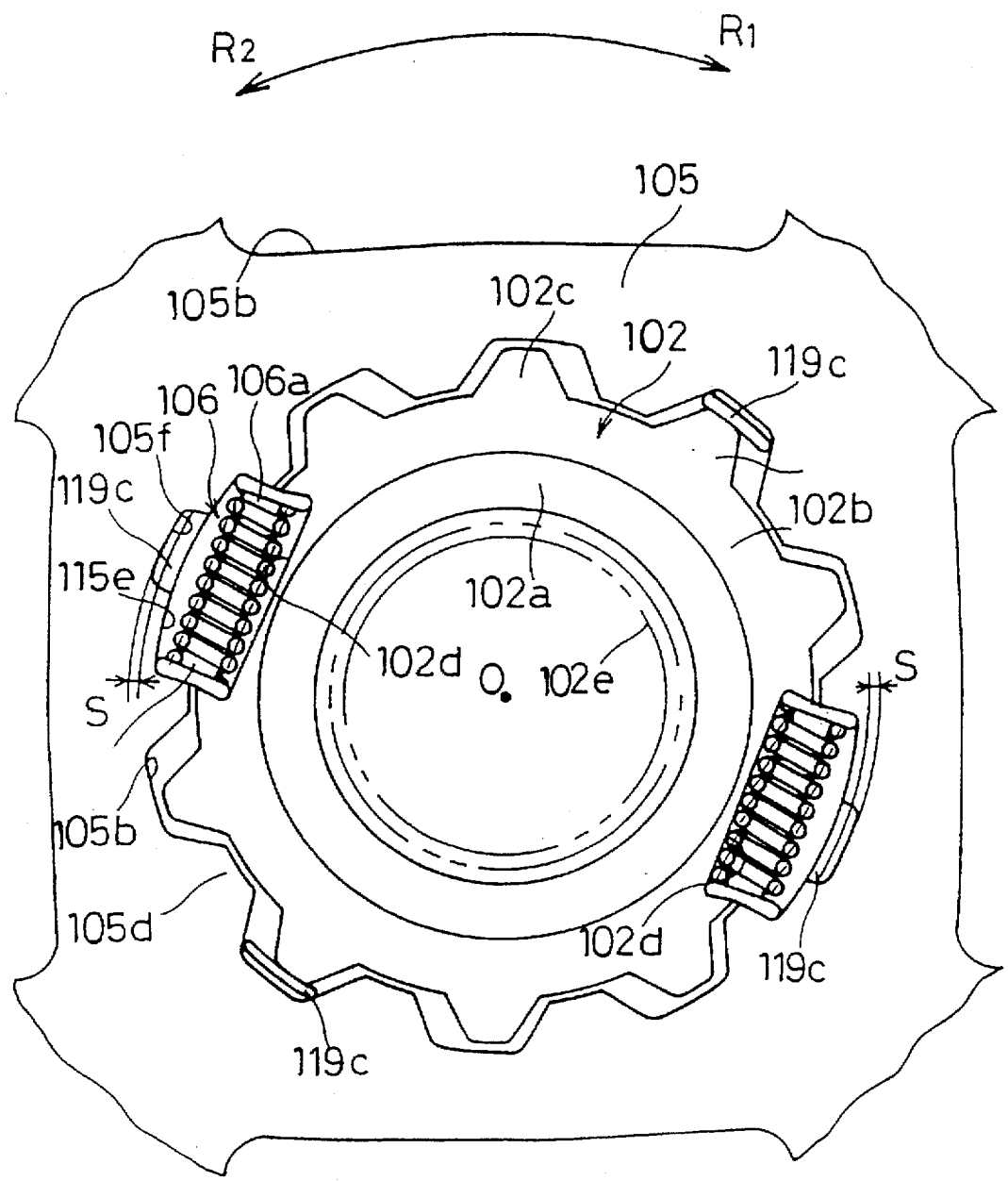
FIG. 13 is a fragmentary, enlarged view of a portion of FIG. 12, with portions of the clutch disc assembly removed for clarity, showing the engagement between a hub with a sub plate.

The hub 102 is disposed in the center of the clutch disc assembly 101 and coupled to a shaft (not shown) of the transmission. The hub 102 is made up of a cylindrical boss 102a extending axially and a flange 102b integrally formed in the outer periphery of the boss 102a. A plurality of spline teeth 102c extending radially outwardly are formed in the outer periphery of the flange 102b radially outwardly at regular intervals. As shown in FIG. 13, cutaways 102d are so defined as to receive both ends of the first coil spring 106 (described below) at two locations which are radially opposed to each other on the flange 102b. Also, a spline hole 102e which is spline-engaged with the shaft (not shown) of the transmission is defined on the inner peripheral side of the boss 102a.

The sub-plate 105 is disposed substantially flush with the flange 102b in the outer periphery of the flange 102b of the hub 102. The sub-plate 105 is formed of a disc-shaped plate having a center hole. The sub-plate 105, as is apparent from FIG. 12, includes four protruding portions 105a extending radially outwardly. A window hole 105b that extends in a circumferential direction is defined in each of the protruding portions 105a. Spline teeth 105d are formed on corresponding portions between spline teeth 102c of the hub 102 on the inner peripheral side of the sub-plate 105. A predetermined gap is ensured between each spline tooth 102c and each spline tooth 105d in a circumferential direction, thereby being capable of rotating the hub 102 and the sub-plate 105 relatively by a predetermined angle. Inner cutaways 105e are defined at two locations corresponding to the cutaways 102d of the hub 102 on the inner peripheral side of the sub-plate 105. The first coil spring 106 is disposed between the cutaway 102d and the inner cutaway 105e. Seat members 106a are disposed on both ends of the first coil spring 106 in such a manner that the seat members 106a are abutted against the side portion of the cutaway 102d and both of circumferential ends of the inner cutaway 105e. It should be noted that the spline teeth 102c are disposed at the side of R2 between the respective spline teeth 105d in a free state shown in FIGS. 12 and 13.

A cutaway 105f is formed in the center of the inner cutaway 105e radially outwardly. Further, a predetermined gap is defined radially between a tooth bottom portion 105h and the spline tooth 102c between the spline teeth 105d on the inner peripheral side of the sub-plate 105.

On both sides of the sub-plate 105 are disposed the clutch plate 103 and the retaining plate 104. The clutch plate 103 and the retaining plate 104 form a pair of nearly disc-shaped members with center holes which are rotatably disposed on the outer peripheral side of the boss 102a of the hub 102. The clutch plate 103 and the retaining plate 104 are fixed to each other by abutting pins 111 at the outer peripheral portion thereof. The abutting pins 111 are inserted into the cutaways 105c between the protrusions 105a of the sub-plate 105, respectively. Because a predetermined gap is ensured between the abutting pin 111 and the end surface of the cutaway 105c in a circumferential direction, the plates 103, 104 and the sub-plate 105 are relatively rotatable within a range of a predetermined angle.

In the outer periphery of the clutch plate 103 are disposed a friction coupling portion 110. The friction coupling portion 110 is mainly made up of an annular cushioning plate 112 and friction facings 113. The cushioning plate 112 has an annular portion 112a which is fixed to the clutch plate 103 by the abutting pins 111, and a plurality of cushioning portions 12b disposed on the outer peripheral side of the annular portion 112a. The friction facings 113 are fixed to both surfaces of the cushioning portions 112b. It should be noted that an engine flywheel (not shown) is disposed at the left side of the friction facings 113 in FIG. 11, and when the friction facings 113 are pressed against the flywheel by a pressure plate not shown, an engine torque is inputted to the clutch disc assembly 101.

The clutch plate 103 and the retaining plate 104 have window holes 103a and 104a formed at positions corresponding to the window holes 105b of the sub-plate 105, respectively. The second coil springs 107 are disposed within the window holes 103a and 104a. Retaining portions 103b and 104b, which are cut and extend axially outwardly, are formed radially on both sides of the respective window holes 103a and 104a.

In the embodiment shown in FIGS. 11–20, there are four (4) second coil springs 107 in total, each of which are made up of a large coil spring 107a and a small coil spring 107b. Both of circumferential ends of the second coil spring 107 are abutted against both of circumferential ends of the window holes 105b, 103a and 104a.

Four holes 103c and four holes 104c which are engaged with parts of the frictional resistance generation mechanism 108 (which will be described later) are formed in a circumferential direction at regular intervals on the inner peripheral sides of the clutch plate 103 and the retaining plate 104.

Figure 14:
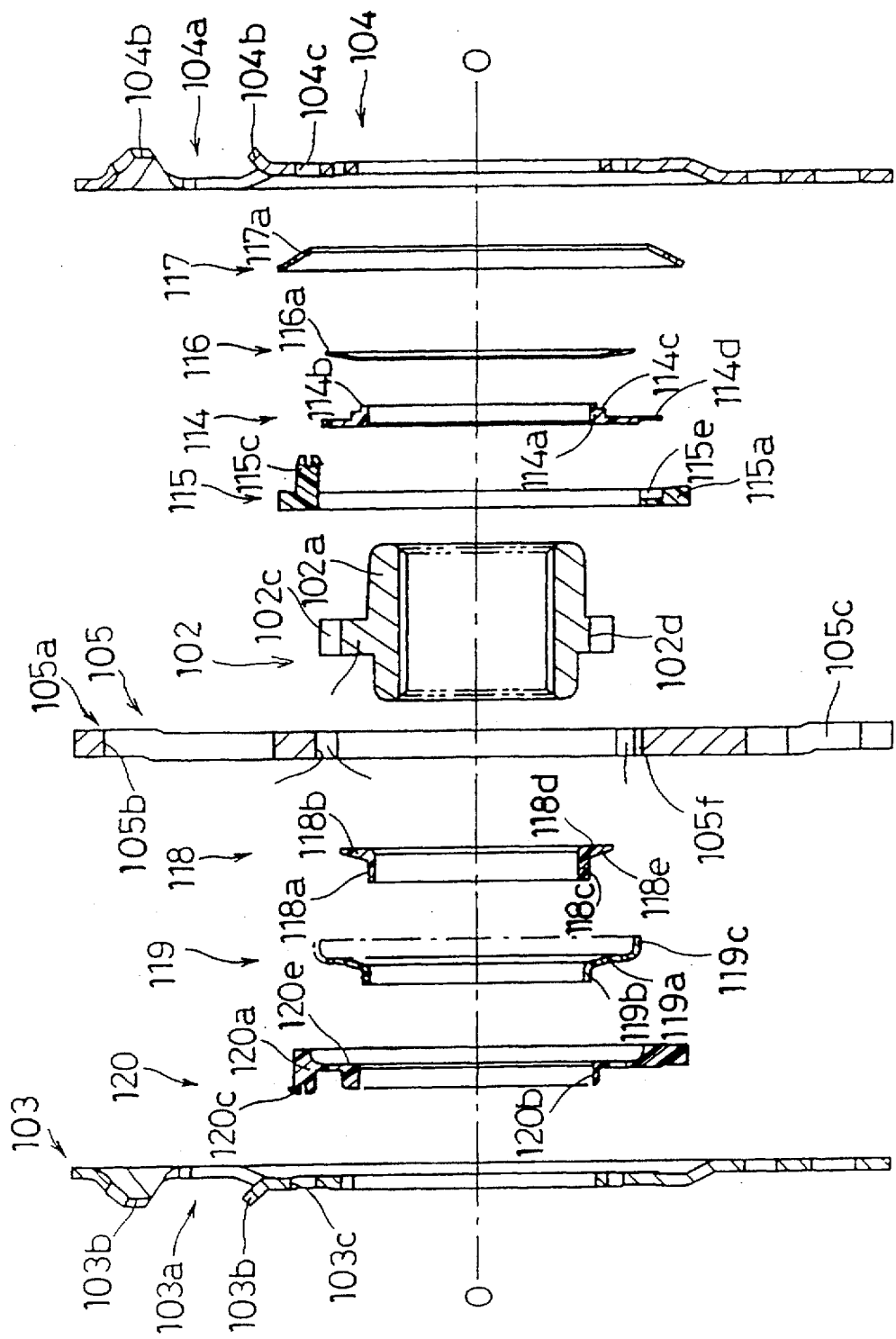
FIG. 14 is an exploded, cross-sectional view of various portions of the clutch disc assembly depicted in FIG. 11, shown on a slightly enlarged scale.
Figure 15:
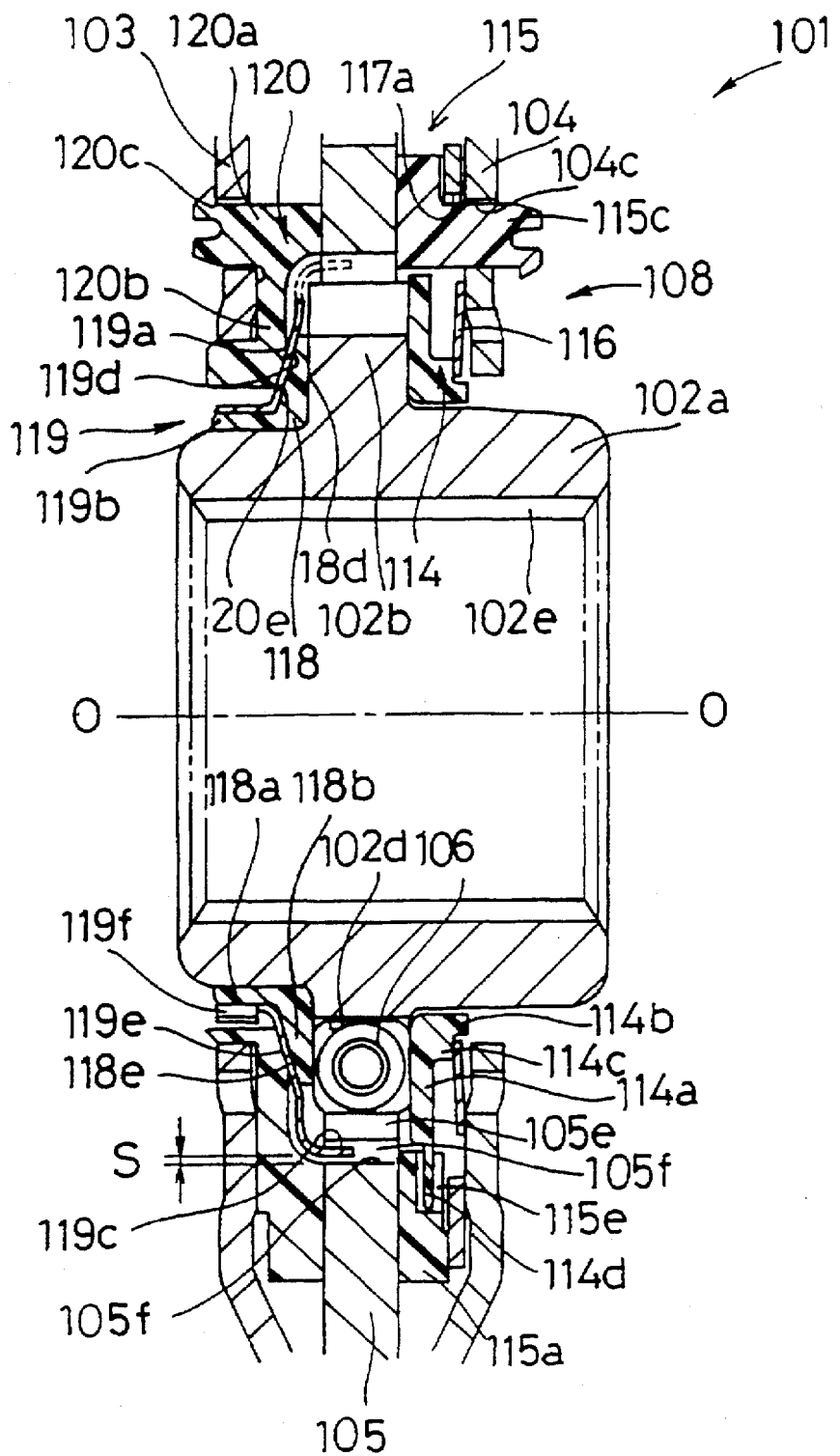
FIG. 15 is a fragmentary, enlarged view of a portion of FIG. 11.

The frictional resistance generation mechanism 108 shown in detail in FIGS. 14 and 15 is made up of a plurality of annular members disposed on the outer peripheral side of the boss 102a between the inner peripheral portion of the clutch plate 103 and the inner peripheral portion of the retaining plate 104 axially. The members constituting the frictional resistance generation mechanism 108 are a first friction washer 114, a fourth friction washer 115, a first cone spring 116, a second cone spring 117, a second friction washer 118, a plate member 119, and a third friction washer 120.

The first friction washer 114 is formed of a resin disc-shaped plate. The first friction washer 114 includes a disc portion 114a, one side surface of which is abutted against the flange 102b of the hub 102, an annular protrusion portion 114b that protrudes from the inner peripheral side of the disc portion 114a toward the transmission side. The annular protrusion portion 114b has an annular cutaway groove 114c formed at the transmission side. Also, four protrusions 114d that extend radially outwardly are formed in the outer periphery of the disc portion 114a.

The first cone spring 116 is disposed axially between the first friction washer 114 and the retaining plate 104. The first cone spring 116 has its outer peripheral end abutted against the retaining plate 104 and its inner peripheral end abutted against the annular cutaway groove 114c of the first friction washer 114. The first cone spring 116 is disposed in a compressed state and urges the first friction washer 114 toward the flange 102b and the spline teeth 102c of the hub 114. A plurality of cutaways 116a (FIG. 12) are defined on the outer peripheral side of the first cone spring 116. Those cutaways 116a are formed to reduce a change in the urging force of the first cone spring 116 when the pose of the first cone spring 116 is changed by the wear of the first friction washer 114.

The fourth friction washer 115 is formed of a disc-shaped member, and is substantially flush with a plane on which the first friction washer 114 is disposed and concentric with the first friction washer 114 on the outer peripheral side of the first friction washer 114. The fourth friction washer 115 is made of the same material as that of the first friction washer 114. The fourth friction washer 115 is mainly made up of a disc member 115a which is abutted against the inner peripheral end surface of the sub-plate 105. Four recesses 115e are formed at regular intervals in a circumferential direction on the inner peripheral side of the disc portion 115a at the transmission side. The protrusion 114d of the first friction washer 114 is engaged with the inside of each recess 115e in such a manner that the former is relatively non-rotatable in a circumferential direction but movable axially. It should be noted that a predetermined gap is ensured axially between the protrusion 114d and the bottom of the recess 115e. Four protrusions 115c that extend toward the transmission side are formed between the recess portions 115e in a circumferential direction in the disc portion 115a. The snap protrusion 115c is snap-shaped at its tip and is inserted into a hole 104c formed in the retaining plate 104.

The second cone spring 117 is disposed axially between the fourth friction washer 115 and the retaining plate 104. A plurality of cutaways 117a (FIG. 2) are defined on the inner peripheral side of the second cone spring 117. Those cutaways 117a are formed to reduce a change in the urging force of the second cone spring 117 when the pose of the second cone spring 117 is changed by the wear of the fourth friction washer 115. The second cone spring 117 has its inner peripheral end abutted against the retaining plate 104 and its outer peripheral end abutted against the side surface of the annular protrusion portion 115a of the fourth friction washer 115 at the transmission side. In this way, the second cone spring 117 is disposed in a compressed state, and urges the fourth friction washer 115 toward the surface of the sub-plate 105 at the transmission side. In this situation, the urging force of the second cone spring 117 is set to be larger than that of the first cone spring 116. It should be noted that the cutaway 117a portion of the second cone spring 117 is associated with the protrusion 115c of the fourth friction washer 115 in such a manner that they does not mutually interfere with each other.

The second friction washer 118 which is formed of an annular resin member is disposed between the inner peripheral portion of the clutch plate 103 and the flange 102b of the hub 102. The second friction washer 118 is mainly made up of a cylindrical portion 118a and a flange 118b. The cylindrical portion 118a is abutted against the outer periphery of the boss 102a. Also, the flange 118b extends from the transmission side end of the cylindrical portion 118a, and is abutted against the flange 102b. The transmission side surface of the flange 118b is of a friction surface 118d which is abutted against the flange 102b, and the opposite surface thereof is of a tapered surface 118e of the truncated cone surface shape.

Figure 16:
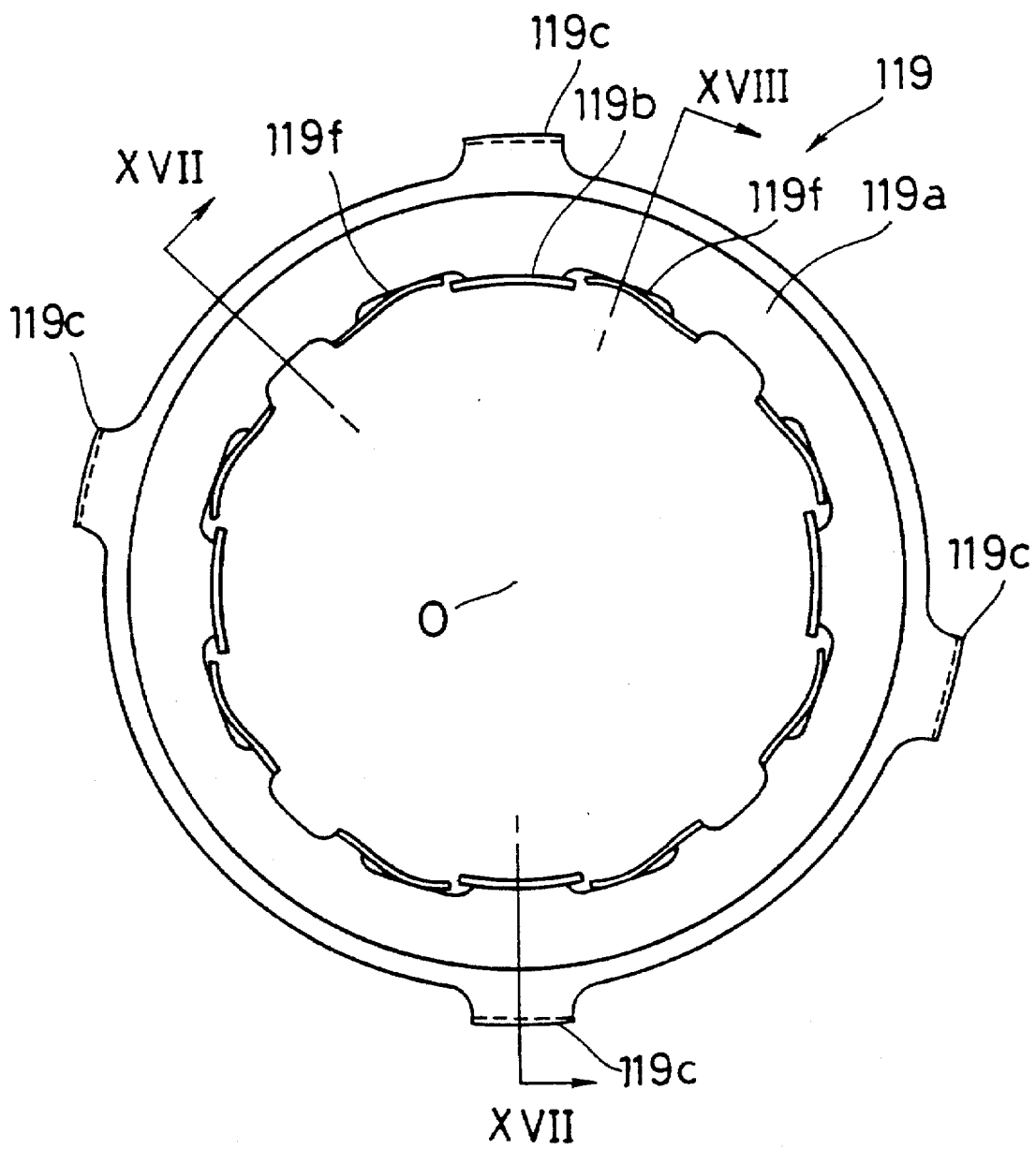
FIG. 16 is a plan view showing a plate member of the clutch disc assembly, shown removed from the clutch disc assembly depicted in FIGS. 11–15.
Figure 18:
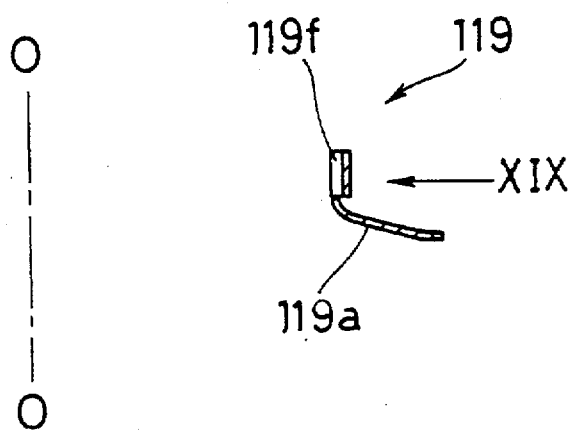
FIG. 18 is a cross-sectional view taken along a line XVIII-O of FIG. 16, looking in the direction of the arrows.
Figure 19:
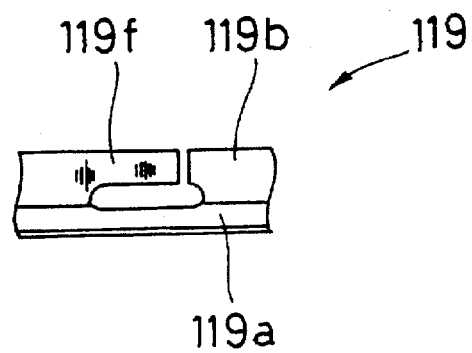
FIG. 19 is a fragmentary, end view of the plate member depicted in FIGS. 16–18, looking in the direction of the arrow XIX in FIG. 18.

The plate member 119 is made of a sheet metal, and is formed of an annular plate member which is mainly made up of a tapered annular portion 119a as is apparent from FIGS. 16 and 17. The inner tapered surface 119d of the annular portion 119a is abutted against the tapered surface 118e of the second friction washer 118. Further, the outer tapered surface 119e of the annular portion 119a is directed toward the inner peripheral end side of the clutch plate 103. Four support portions 119b are formed on the inner peripheral side of the tapered annular portion 119a at regular intervals in a circumferential direction. The support portions 119b extend in a circumferential direction and are abutted against the outer peripheral surface of the cylindrical portion 118a of the second friction washer 118. Further, elastic urging portions 119f extending in a circumferential direction longitudinally on both sides of the respective support portions 119b in a circumferential direction are formed on the inner peripheral side of the annular portion 119a. The elastic urging portion 119f is abutted against the cylindrical portion 118a at the base end side and abutted against the inner peripheral surface of the cylindrical portion 120b (described below) at the tip side. Four claws 119c extend axially from the outer peripheral side of the tapered annular portion 119a. Two of the claws 119c extend within the cutaway 105f of the sub-plate 105. As a result, the plate member 119 and the sub-plate 105 are relatively non-rotatable. It should be noted that a gap S (FIGS. 13 and 19) is ensured radially between the sub-plate 105 and the claws 119c. In this state, the sub-plate 105 is slightly radially movable. The remaining two claws 119c extend within spaces defined between the spline teeth 102c and the tooth bottom portions 105h.

The third friction washer 120 is made of resin and includes an annular portion 120a, a cylindrical portion 120b extending from the inner peripheral side of the annular portion 120a toward the engine side thereof, and protrusions 120c formed at four locations at regular intervals. The annular portion 120a is abutted against the inner peripheral side surface of the sub-plate 105. The cylindrical portion 120b is disposed inside of the inner peripheral end portion of the clutch plate 103 and engaged with the clutch plate 103 so as not to be relatively rotatable. Further, the protrusion 120c is snap-fitted into the hole 103c formed in the clutch plate 103. A tapered surface 120e which are abutted against the outer tapered surface 119e of the plate member 119 is formed on the transmission side surface of the cylindrical portion 120b. In this way, the clutch plate 103 and the retaining plate 104 are positioned radially with respect to the hub 102.

In the above-mentioned structure, the respective elastic urging portions 119f are so disposed as to be compressed radially between the cylindrical portion 118a and the cylindrical portion 120b. As a result, the elastic urging portion 119f urges the clutch plate 103 and the hub 102 in such a manner that they are concentric with each other.

Next, the operation of the clutch disc assembly 101 will be described.

In assembling the clutch disc assembly 101 thus organized, the first friction washer 114, the fourth friction washer 115, the first cone spring 116, and the second cone spring 117 in the frictional resistance generation mechanism 108 are assembled with the retaining plate 104 into a sub-assembly in advance. This assembling work can be simply performed by merely inserting the protrusion 115c of the fourth friction washer 115 into the hole 104c of the retaining plate 104. The fourth friction washer 115 is so designed as to prevent the first friction washer 114, the first cone spring 116 and the second cone spring 117 from falling off from the retaining plate 104. With the above members being thus formed into the sub-assembly, the respective members before being completely assembled can be managed in a sub-assembly state, thereby being capable of facilitating the work. Also, the working efficiency at the time of completely assembling the respective members is remarkably improved owing to the sub-assembly. It should be noted that the third friction washer 120 is similarly assembled with the clutch plate 103 into a sub-assembly in advance.

The shaft of the transmission is allowed to approach the clutch disc assembly 101 from the right side of FIG. 11 with respect to the clutch disc assembly 101. The shaft (not shown) is fitted into the spline hole 102e defined on the inner peripheral side of the boss 102a. In this situation, it is assumed that the shaft is slightly inclined from the just center axis line 0—0. In the case where misalignment is thus made, the hub 102, the second friction washer 118 and the plate member 119 movably follow the shaft. In this situation, the outer tapered surface 119e of the plate member 119 slides on the tapered surface 120e of the third friction washer 120. In this state, one of the cutaways 105f of the sub-plate 105 is abutted against the claw 119c of the plate member 119. In this situation, no unbalanced load is developed between the third friction washer 120 and the plate member 119.

Upon allowing the friction facing 113 to be pushed on the flywheel (not shown) at the engine side, a torque of the engine flywheel is inputted to the clutch plate 103 and the retaining plate 104. The torque is transmitted to the hub 102 through the second coil spring 107, the sub-plate 105 and the first coil spring 106, and further transmitted to the shaft of the transmission side not shown.

Upon the transmission of torsional vibrations to the clutch disc assembly 101, the relative rotation is periodically conducted between the plates 103, 104 and the hub 102. In this situation, the first coil spring 106 and the second coil spring 107 are compressed in a circumferential direction, whereby a friction is produced by the frictional resistance generation mechanism 108. This causes a hysteresis to be generated in relation between the twist angle and the torsional torque.

In a range where the twist angle is small, the relative rotation is generate between the plates 103, 104 and the sub-plate 105, and the hub 102. At this time, the first coil spring 106 is compressed in a circumferential direction, and the first friction washer 114 and the second friction washer 118 frictionally slide on the flange 102b of the hub 102. In this situation, the characteristics of the low rigidity and the low hysteresis torque permit the fine torsional vibrations to be effectively attenuated. It should be noted that in the presence of misalignment, the configuration of the present invention is such that little or no unbalanced load is developed between the plate member 119 and the third friction washer 120, thereby making it difficult to generate unwanted additional frictional resistance between the plate member 119 and the third friction washer 120. Also, the sub-plate 105 is positioned by the claw 119c of the plate member 119, thereby making it difficult to produce an unnecessary frictional resistance with the sub-plate 105 being in contact with the flange 102b. In the above-mentioned manner, the hysteresis torque can be maintained in small in the characteristics of the first-step. Specifically, the present invention is such that in the presence of misalignment of a transmission shaft (not shown) being connected to the hub 102, little or no additional friction resistance is generated because of the configuration of the present invention, when compared to the friction resistance generated where no misalignment is present.

In a range where the twist angle is large, the first coil spring 106 is compressed so that the sub-plate 105 and the hub 102 are integrally rotated, whereby the relative rotation is generated between those members and the plates 103, 104. In this situation, the second coil spring 107 is compressed, the first friction washer 114 slides together with the flange 102b of the hub 102, the fourth friction washer 115 slides on the inner peripheral side surface of the sub-plate 105, and further the third friction washer 120 frictionally slides on the plate member 119 and the sub-plate 105. In this situation, the characteristics of the high rigidity and the high hysteresis allow the large torsional vibrations to be effectively attenuated.

If the friction facings 113 are partially in press contact with each other at the time of engaging the clutch, when the friction facings 113 are coupled to the flywheel (not shown), the plates 103, 104 and the like are made eccentric with respect to the hub 2. Even in this case, after disengaging the clutch, the plates 103, 104 and the like are so returned as to be concentric with the hub 102 due to the urging force by an elastic urging portion 119f. As a result, the unbalance of the entire clutch disc assembly 101 is not increased. Also, because the hub 102 and the plates 103, 104 are maintained in the concentric state, the hub 102 is movable with respect to the plates 103, 104 and the like when misalignment occurs.

Figure 20:
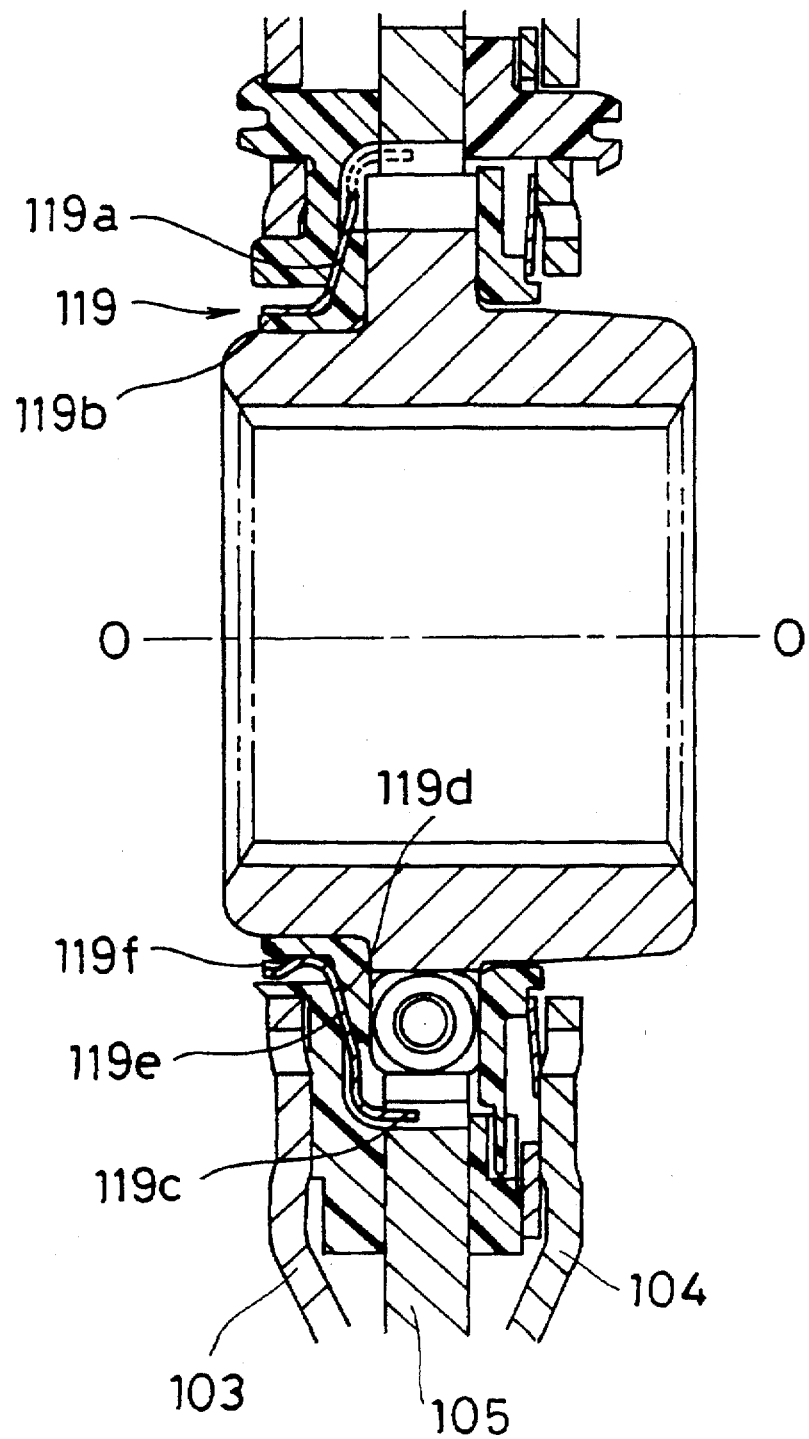
FIG. 20 is similar to FIG. 15 and shows a modification of the second embodiment.

Modifications To The Second Embodiment a) In the second embodiment, the outer tapered surface 119e of the plate member 119 and the tapered surface 120e of the third friction washer 120 are tapered in the form of truncated cones, respectively. Alternatively, the tapered surfaces 119e and 120e may be formed as spherical surfaces.

b) In the second embodiment, the respective urging portions 119 of the plate member extend in a circumferential direction in such a manner that a portion which is abutted against the cylindrical portion 120b and a portion which is abutted against the cylindrical portion 118a are arranged in a circumferential direction. Instead, as shown in FIG. 20, both the abutting portions of the respective elastic urging portions 119f may be arranged axially.

Third Embodiment

Figure 21:
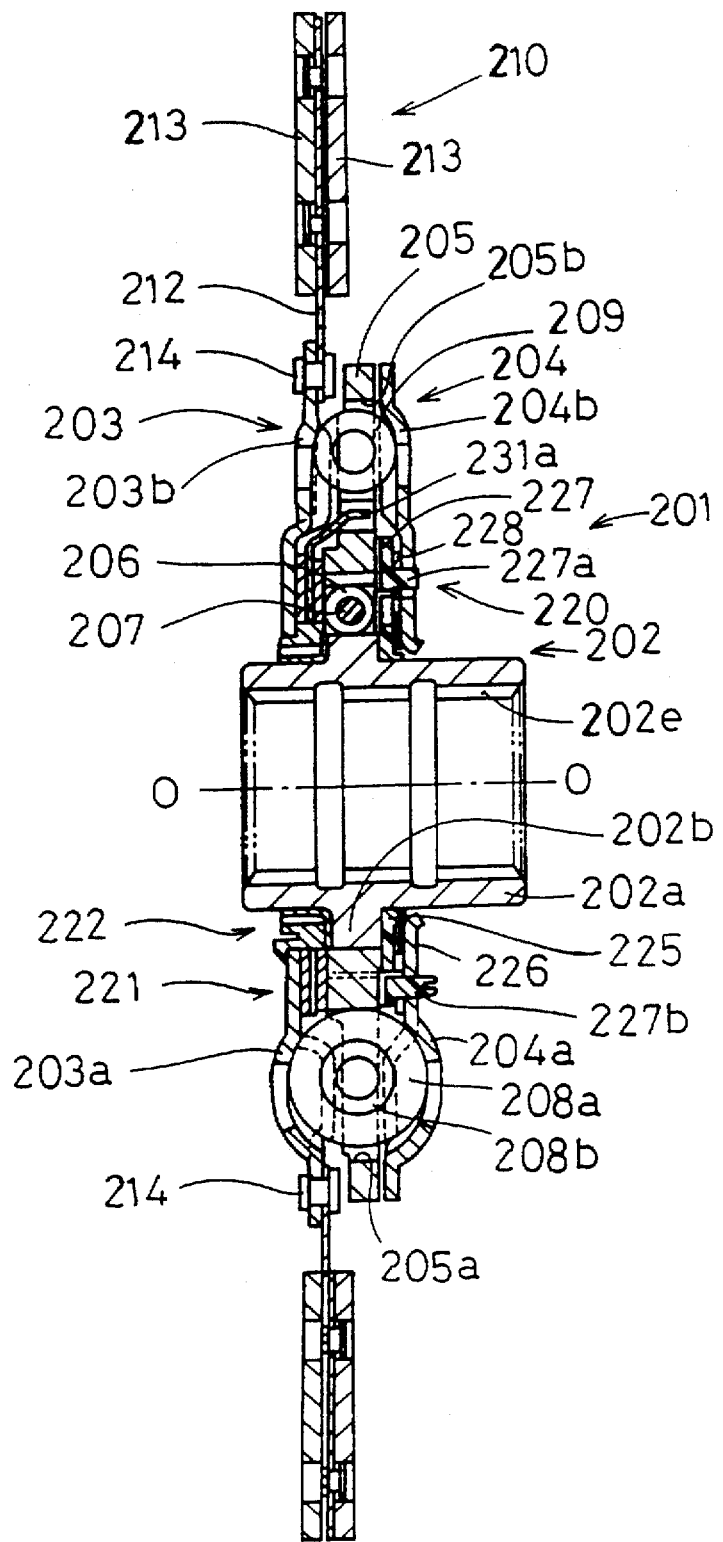
FIG. 21 is a side cross-sectional view showing a clutch disc assembly in accordance with a third embodiment of the present invention.

FIGS. 21–24 show a clutch disc assembly 201 in accordance with a third embodiment of the present invention. The clutch disc assembly 201 is a unit for transmitting torque from an engine (not shown) disposed at the left side of FIG. 21 to or from a transmission (not shown) disposed at the right side of FIG. 21. A line 0—0 in FIG. 21 represents a rotary axis line of the clutch disc assembly 201.

The clutch disc assembly 201 is mainly made up of a hub 202 acting as an output member, a clutch plate 203 as well as a retaining plate 204 acting as an input member, a intermediate plate 205 acting as an intermediate member, a first coil springs 206 disposed between the intermediate plate 205 and the hub 202 so as to limit the relative rotation of the intermediate plate 205 and the hub 202, a rubber float 207, second and third coil springs 208, a fourth spring 209, and first and second hysteresis generation mechanisms 220 and 221 that generate predetermined hysteresis torques when the relative rotation is generated between the plates 203, 204 and the hub 202.

Figure 22:
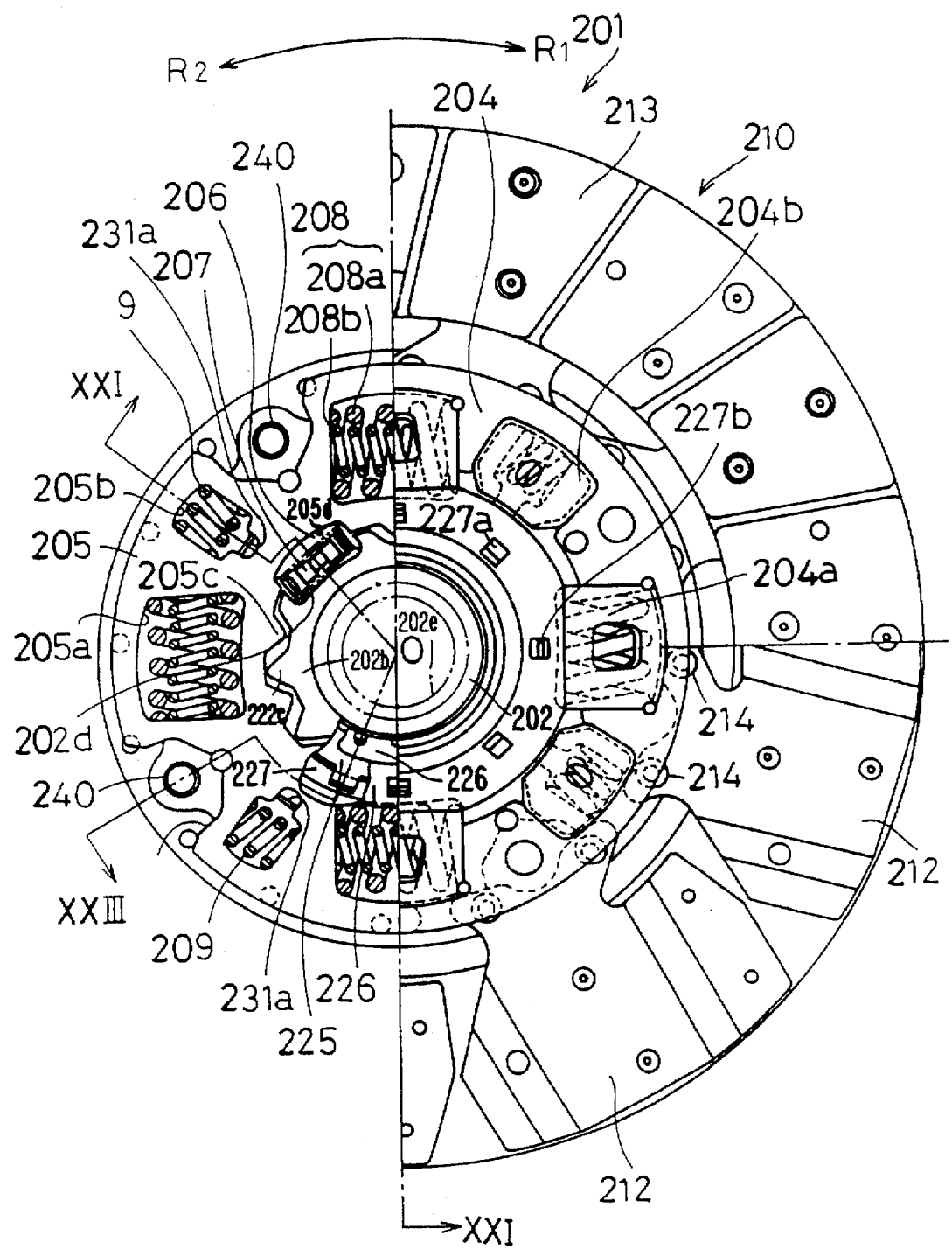
FIG. 22 is fragmentary, part plan view, part cross-sectional view, showing the clutch disc assembly depicted in FIG. 21, where

The hub 202 is disposed in the center of the clutch disc assembly 201 and coupled to a shaft (not shown) of the transmission. The hub 202 is made up of a cylindrical boss 202a extending axially and a flange 202b integrally formed in the outer periphery of the boss 202a. As shown in FIG. 22, a plurality of outer peripheral teeth 202c that extend radially outwardly are formed in the outer periphery of the flange 202b at regular intervals. Cutaway receiving portions 202d are so defined as to receive both ends of the first coil spring 206, which will be described later, at two locations which are radially opposed to each other on the flange 202b. Also, a spline hole 202e which is spline-engaged with the shaft (not shown) of the transmission is defined on the inner peripheral side of the boss 202a.

The intermediate plate 205 is so disposed as to be substantially flush with the flange 202b in the outer periphery of the flange 202b of the hub 202. The intermediate plate 205 is formed of a disc-shaped plate having a center hole. The intermediate plate 205 has four first window holes 205a extending in a circumferential direction. Furthermore, a second window hole 205b short in the circumferential and radial lengths is formed adjacent to each of the first window holes 205a at the side of R1. An inner peripheral tooth 205c extending between the respective outer peripheral teeth 202c of the hub 202 is formed on the inner peripheral side of the intermediate plate 205. A predetermined gap is ensured in a circumferential direction between the respective outer peripheral teeth 202c and inner peripheral teeth 205c, whereby the hub 202 and the intermediate plate 205 are relatively rotatable within a predetermined angle. It should be noted that the outer peripheral teeth 202c of the hub 202 are disposed, in a free state, at the side of R2 in the gap between the outer peripheral teeth 202c and the inner peripheral teeth 205c of the intermediate plate 205. Cutaway receiving portions 205d are defined at two locations corresponding to the cutaway receiving portions 202d of the hub 202 on the inner peripheral side of the intermediate plate 205. The first coil spring 206 is disposed within those cutaway receiving portions 202d and 205d. Seat members are disposed on both ends of the first coil spring 206 in such a manner that the seat members 206a are abutted against both of ends of the cutaway receiving portions 202d and 205d in a circumferential direction. Moreover, a rubber float 207 is disposed within the first coil spring 206. In a free state shown in FIG. 22, the rubber float 207 maintains a predetermined gap between the rubber float 207 and the seat member of the first coil spring 206 in a circumferential direction.

Between a pair of first and second window holes 205a and 205b in a circumferential direction are formed cutaways 205e which are opened outwardly on the outer peripheral portion.

The clutch plate 203 and the retaining plate 204 are disposed on both sides of the intermediate plate 205. The clutch plate 203 and the retaining plate 204 form a pair of nearly disc-shaped members each having a center hole and are rotatably disposed on the outer peripheral side of the boss 202a of the hub 202. The clutch plate 203 and the retaining plate 204 are fixed to each other by abutting pins 240 at the outer peripheral portion thereof. The abutting pins 240 penetrate the cutaways 205e of the intermediate plate 205. Because the abutting pins 240 and the cutaways 205e are ensured with predetermined gaps in a circumferential direction, the plates 203, 204 and the intermediate plate 205 are relatively rotatable within a predetermined angle.

In the outer periphery of the clutch plate 203 are disposed a friction coupling portion 210. The friction coupling portion 210 includes a plurality of cushioning plates 212 and two friction facings 213. Each cushioning plate 212 is fixed to the clutch plate 203 by a plurality of rivets 214. The friction facings 213 are fixed to both surfaces of the cushioning plates 212. It should be noted that an engine flywheel (not shown) is disposed at the left side of the friction facings 213 in FIG. 21, and when the friction facings 213 are pressed against the flywheel by a pressure plate not shown, an engine torque is inputted to the clutch disc assembly 201.

The clutch plate 203 and the retaining plate 204 have first support portions 203a, 204a and second support portions 203b, 204b formed at positions corresponding to the first window holes 205a and the second window holes 205b, respectively. The first support portions 203a, 204a and the second support portions 203b and 204b are drawing portions that protrude axially by a drawing process. The circumferential lengths of the first support portions 203a and 204a are nearly equal to that of the first window hole 205a whereas the circumferential lengths of the second support portions 203b and 204b are longer than that of the second window hole 205b.

The second and third coil springs 208 are made up of a second coil spring 208a and a third coil spring 208b disposed therein. Those second and third coil springs 208a and 208b are disposed within the first window hole 205a and the first support portions 203a, 204a. The fourth coil spring 209 are disposed within the second window hole 205b and the second support portions 203b, 204b. It should be noted that predetermined gaps are defined between the fourth coil spring 209 and the circumferential ends of the second support portions 203b, 204b.

The first hysteresis torque generation mechanism 220 are disposed between the inner peripheral portion of the retaining plate 204 and the inner peripheral portions of the flange 202b and the intermediate plate 205. An annular first resin friction material 225 is abutted against the side surface of the flange 202b. A first cone spring 226 is disposed between the first resin friction material 225 and the retaining plate 204 in such a manner that the material 225 and the plate 204 are away from each other by the urging of the first cone spring 226. A second resin friction material 227 is disposed on the outer peripheral side of the first resin friction material 225 and is abutted against the inner peripheral side surface of the intermediate plate 205. A first engaging portion 227a and a second engaging portion 227b which protrude axially are formed on the inner peripheral portion of the second resin friction material 227. The first and second engaging portions 227a and 227b extend into holes defined in the retaining plate 204. It should be noted that the second engaging portion 227b is in the form of a snap so as to retain the second resin friction material 227 against the retaining plate 204. The first resin friction material 225 and the second resin friction material 227 are engaged with each other so as to rotate together.

The second cone spring 228 is disposed between the second resin friction material and the retaining plate 204 in such a manner that the material and the plate 204 are away from each other axially by the urging of the second cone spring 228.

Figure 23:
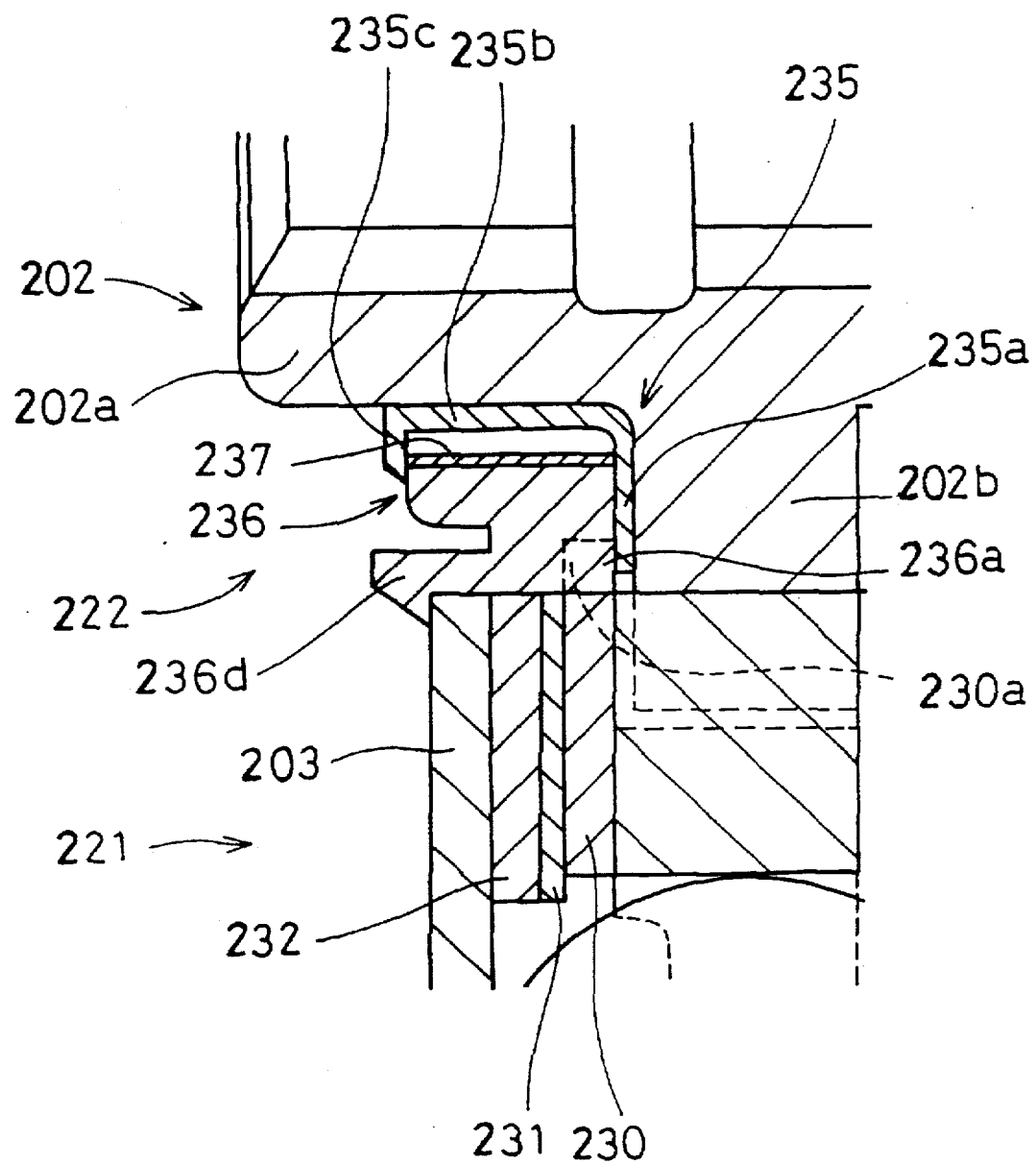
FIG. 23 is a fragmentary, enlarged view of a portion of FIG. 21.
Figure 24:
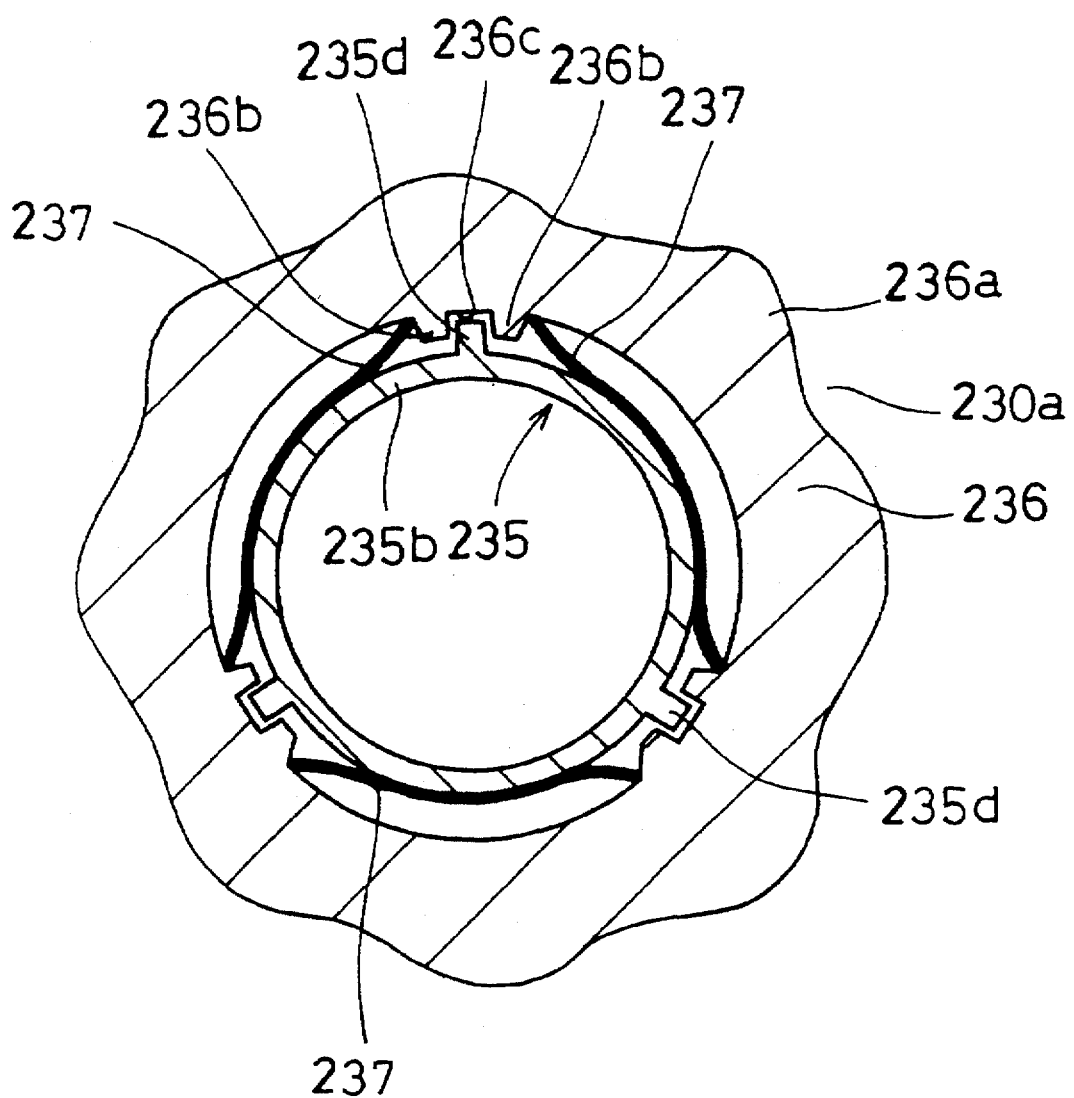
FIG. 24 is a vertical cross-sectional view showing a bushing assembly of the clutch disc assembly depicted in FIGS. 21–23.

As is apparent from FIGS. 23 and 24, the second hysteresis torque generation mechanism 221 is disposed between the inner peripheral portion of the clutch plate 203 and the inner peripheral portions of the flange 202b and the intermediate plate 205. The second hysteresis torque generation mechanism 221 is mainly made up of a bushing 222, a first friction washer 230, a drive plate 231 and a second friction washer 232.

The first friction washer 230 is abutted against the inner peripheral side surface of the intermediate plate 205, that is, the inner side of the first window hole 205a. An inner engaging wave portion 230a is formed on the inner peripheral portion of the first friction washer 230. The drive plate 231 is abutted against the engine side surface of the first friction washer 230. Four protrusion engaging portions 231a are formed at regular intervals in a circumferential direction on the outer peripheral portion of the drive plate 231, as is shown in FIG. 22. The protrusion engaging portion 231a is slender and extends radially outwardly and is relatively non-rotatably engaged in a circumferential direction with a width-narrowed portion of the second window hole 205b of the intermediate plate 205, which is defined radially on the inner side thereof. As a result, the drive plate 231 is integrally rotated with the intermediate plate 205. The second friction washer 232 is disposed between the clutch plate 203 and the drive plate 231.

Referring now to FIGS. 23 and 24 the bushing 222 includes a first annular member 235, a second annular member 236 and three leaf springs 237. The first annular member 235 is made of a material having a generally low friction coefficient. The first annular member 235 includes a disc portion 235a, a cylindrical portion 235b extending axially from its inner peripheral edge and an elastically deformable annular support portion 235c that extends radially outwardly from its tip. The disc portion 235a is abutted against the engine side surface of the flange 202b. The cylindrical portion 235b is abutted against the outer peripheral surface of the boss 202a. Three protrusion portions 235d extending radially outwardly are formed on the outer peripheral surface of the cylindrical portion 235b. The protrusion portions 235d are arranged at regular intervals in a circumferential direction.

The second annular member 236 is disposed in the outer periphery of the first annular member 235 and interposed axially between the disc portion 235a and the support portion 235c. A pair of support portions 236b that extend radially inwardly are formed in a circumferential direction at three locations on the inner peripheral surface of the second annular member 236. A protrusion portion 235d of the first annular member 235 is inserted into a recess 236c formed between the pair of support portions 236b with a predetermined gap. It should be noted that a slight gap is defined in a circumferential direction radially between the recess 236c and the protrusion portion 235d in a torsion free state. An elastically deformable fixed portion 236d which is abutted against the engine side surface of the inner peripheral portion of the clutch plate 203 is formed on the outer peripheral portion of the second annular member 236. It should be noted that the second annular member 236 is non-rotatably engaged with the clutch plate 203. The second annular member 236 is made of material high in strength.

As described above, the second hysteresis torque generation mechanism 221 is assembled with the inner peripheral portion of the clutch plate 203 into a sub-assembly. In other words, the clutch plate 203, the first friction washer 230, the drive plate 231 and the second friction washer 232 are fixed to each other by the bushing 222. More specifically, the disc portion 235a of the first annular member 235 is abutted against the side surface of the inner peripheral engaging wave portion 230a of the first friction washer 230 at the transmission side, and the fixed portion 236d of the second annular member 236 is abutted against the side surface of the inner peripheral portion of the clutch plate 203 at the engine side. Also, the second annular member 236 is interposed between the disc portion 235a of the first annular member 235 and the support portion 235c.

Each leaf spring 237 is disposed radially between the cylindrical portion 235b and the second annular member 236. Each of the leaf springs 237 has both ends in a circumferential direction which are abutted against the support member 236b of the second annular member 236 so that the circumferential movement of the leaf spring 237 is restricted. Furthermore, the intermediate portion of each of the leaf springs 237 urges the cylindrical portion 235b in the central direction in a state where both of the circumferential ends of the leaf spring 237 are supported by the second annular member 236.

In assembling the clutch disc assembly 201 thus configured, the first hysteresis torque generation mechanism 220 is fitted to the retaining plate 204, and the second hysteresis torque generation mechanism 221 is fitted to the clutch plate 203 in advance. In this manner, with the clutch plate 203 and the retaining plate 204 being formed into a sub-assembly in advance, the respective members before being completely assembled can be managed in the sub-assembly state, thereby facilitating the work. Also, in completely assembling the respective members, the working efficiency is remarkably improved because of the sub-assembly. It should be noted that the formation of the sub-assembly is conducted by merely fitting the second engaging portion 227b of the second resin friction material 227 into the retaining plate 204 in the first hysteresis torque generation mechanism 220, and in the second hysteresis torque generation mechanism 221, the support portion 335c and the fixed portion 336d are merely elastically deformed so that the respective members are fixed to each other.

It is assumed that the hub 202 is disposed at a position where it is eccentric with the clutch plate 203 and retaining plate 204. In this case, because the leaf spring 237 urges the hub 202 through the second annular member 235 of the bushing 222 in the central direction, the hub 202 is returned so as to be concentric with the plates 203 and 204. As a result, an unbalance load is difficult to generate between the cylindrical portion of the first annular member 235 of the bushing 222 and the outer peripheral surface of the boss 202a. Consequently, the hysteresis torque generated between the first annular member 235 and the hub 202 is restrained to a lower value. Also, because the first annular member 235 is made of a material having a stable friction coefficient, the hysteresis torque generated by the sliding movement in cooperation with the hub 202 is stabilized. Further, because the first annular member 235 is made of material low in friction coefficient, the hysteresis torque generated by the frictional sliding movement between the first annular member 235 and the second hub 202 is small. Further, because the second annular member 236 is made of material high in strength, it is hardly damaged by the engagement with the first friction washer 230. As described above, the bushing 222 is divided into the first annular member 235 and the second annular member 236, thereby being capable of using an appropriate material in accordance with the respective purposes.

Upon engagement between the friction facing 213 and the flywheel (not shown) at the engine side, a torque of the engine side is inputted to the clutch plate 203 and the retaining plate 204. The torque is transmitted to the hub 202 through the respective coil springs, the intermediate plate 205, and the like, and further transmitted to the shaft of the transmission side.

Upon inputing the torsional vibrations to the clutch disc assembly 201, the plates 203, 204 and the hub 202 are periodically relatively rotated. In this situation, the respective springs are compressed in a circumferential direction, and a hysteresis due to the friction is generated by the first and second hysteresis torque generation mechanism 220 and 221.

In a range where the twist angle is small, the plates 203, 204 and the intermediate plate 205 rotate integrally and relatively rotate with respect to the hub 202. In this situation, the first coil spring 206 is compressed in a circumferential direction, and the first resin friction material 225 and the disc portion 235a of the first annular member 235 frictionally slide on the flange 202b. In this situation, the characteristics of the low rigidity and the low hysteresis torque permit the small torsional vibrations to be effectively attenuated.

In a range where the twist angle is large, the intermediate plate 205 and the hub 202 rotate integrally and relatively rotate with respect to the plates 203 and 204. In this situation, the second and third coil springs 208 and the fourth coil spring 209 are compressed. In the first hysteresis torque generation mechanism 220, the first and second resin friction materials 225 and 227 frictionally slide on the flange 202b and the intermediate peripheral portion of the intermediate plate 205, respectively. Furthermore, in the second hysteresis torque generation mechanism 221, the disc portion 235a frictionally slides on the flange 202b, the first friction washer 230 frictionally slides on both of the intermediate plate 205 and the drive plate 231, and the second friction washer 232 frictionally slides on the drive plate 231 and the clutch plate 203.

In this situation, the characteristics of the high rigidity and the high hysteresis allow the torsional vibrations to be effectively attenuated. In particular, since a plurality of friction surfaces can be obtained in the second hysteresis torque generation mechanism 221, a high hysteresis torque is obtained without any increase in a load of pressing the second cone spring 228. For example, in order to obtain the same hysteresis torque as the conventional one, the load of pressing the second cone spring 228 can be made half since the friction surfaces of the first and second hysteresis torque generation mechanisms 20 and 21 changes from two surfaces to four surfaces.

In this manner, because it is unnecessary to increase the load of pressing the second cone spring 228, the following advantages are obtained.

The lifetime is elongated without increasing the surface pressure of the respective washers.

It is unnecessary to ensure a space for increasing the pressing load.

Even if a stud pin that rigidly couples the inner peripheral portions of the clutch plate 203 and the retaining plate 204 axially is omitted, the inner peripheral portions are hard to deform in a direction where they are away from each other axially. As a result, the hysteresis torque of the first step is stabilized without allowing the set line of the first cone spring 226 to shallow. Also, it is hard to influence the load of pressing the second cone spring 228 on the first cone spring 226, whereby the hysteresis torque of the first step is stabilized.

Fourth Embodiment

Figure 25:
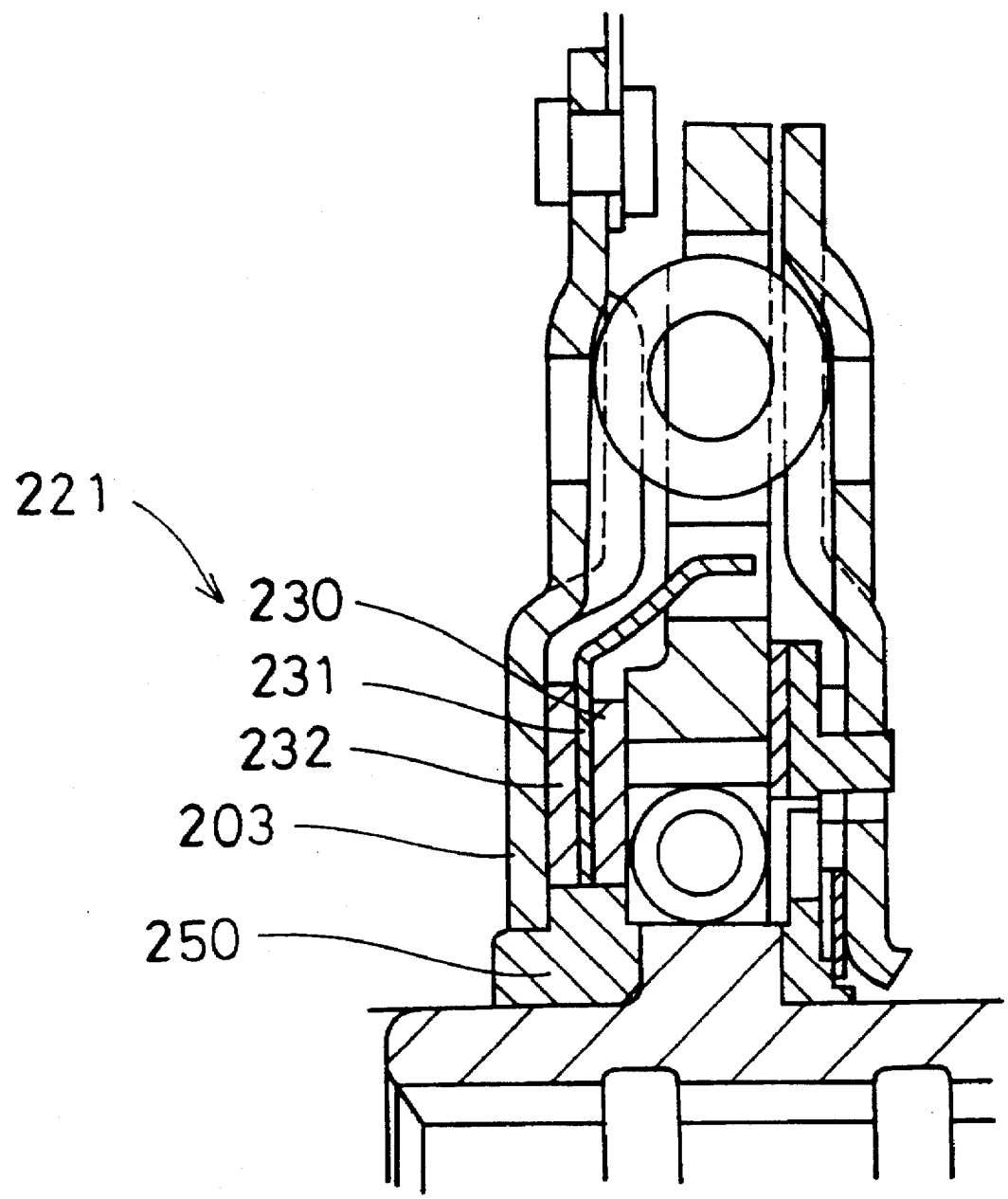
FIG. 25 is a fragmentary, cross-sectional view showing a portion of a clutch disc assembly in accordance with a fourth embodiment of the present invention.

In the above-mentioned embodiments, two bushings are used. Alternatively, a bushing 250 shown in FIG. 25 is an integral member. The outer peripheral portion of the bushing 250 is relatively non-rotatably engaged with the first friction washer 230. The structure of the second hysteresis torque generation mechanism 221 is the same as that in the above described third embodiment. For that reason, a high hysteresis torque can be obtained without any increase in the urging load of the second cone spring 228.

Figure 26:
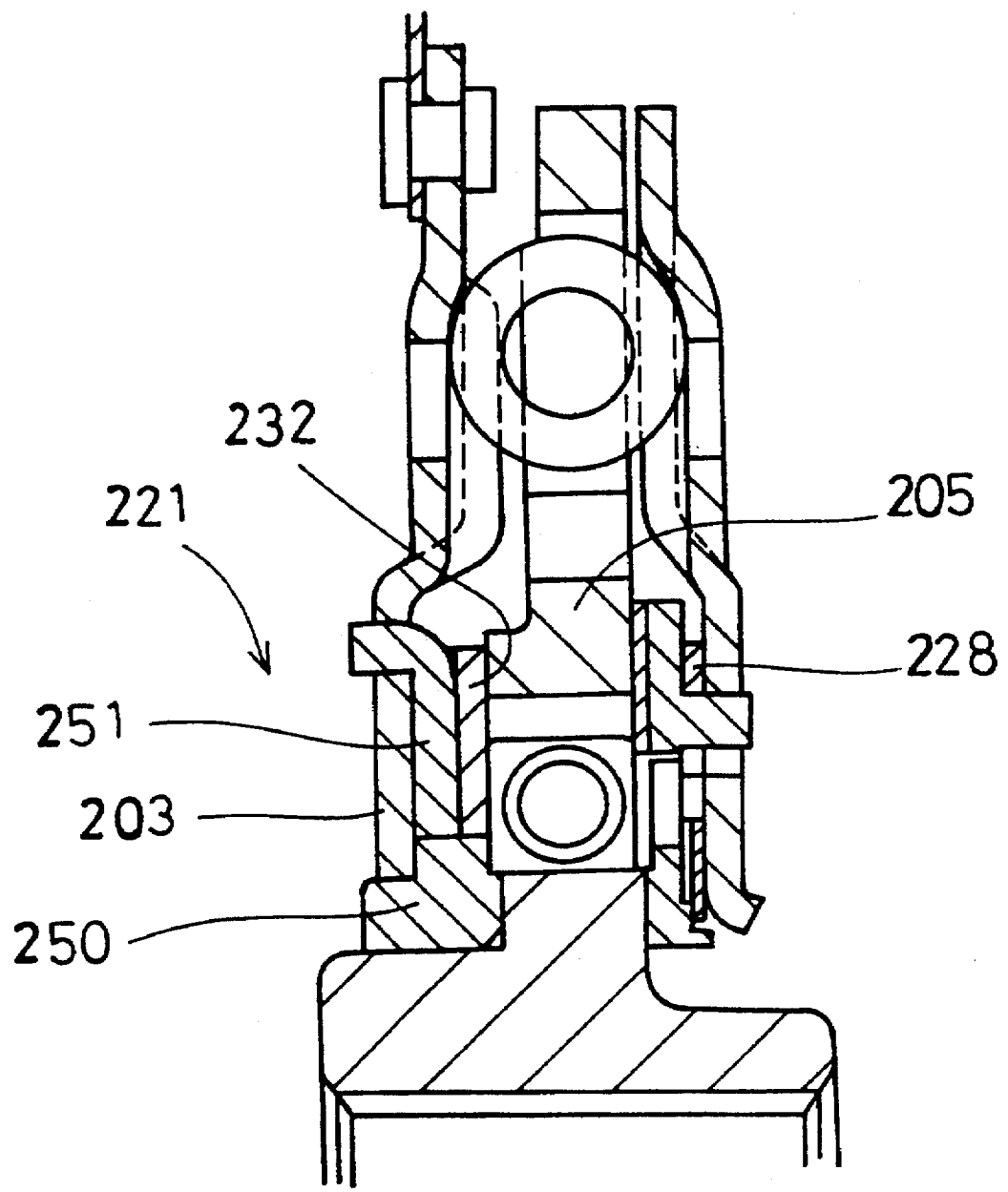
FIG. 26 is a fragmentary, cross-sectional view similar to FIG. 25, showing a modification of the embodiment of the clutch disc assembly depicted in FIG. 25.

Further, the parts constituting the second hysteresis torque generation mechanism 221 shown in FIG. 25 are reassembled, thereby being capable of realizing the second hysteresis torque generation mechanism 221 shown in FIG. 26. In this example, the second friction washer 232 in the first embodiment is abutted against the engine side surface of the internal peripheral portion of the intermediate plate 205. Also, a friction plate 251 which is engaged with the clutch plate 203 is disposed between the clutch plate 203 and the second friction washer 232. In a range where the twist angle is large, the second friction washer 232 frictionally slides between the intermediate plate 205 and the friction plate 251. In this example, in the range where the twist angle is large, because two friction surfaces are obtained in the first and second hysteresis torque generation mechanisms 20 and 21, the hysteresis torque to the same degree of the conventional one is obtained. An alteration between the structure of FIG. 25 and the structure of FIG. 26 can be realized by merely reassembling the washers.

Modifications To The Fourth Embodiment

In the fourth embodiment, the urging member for centering the plates 203, 204 and the hub 202 is not limited to the leaf spring. Other elastic members such as an oil seal may be used instead. The structure in which the second hysteresis torque generation mechanism is formed into the sub-assembly is not limited to the structure in which the fixed portion is elastically deformed. For example, it may be configured to be rotated for assembly and disassembly.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A clutch disc assembly comprising:

a hub having a flange connected to an outer periphery thereof;

a clutch plate having a center hole into which said hub is fitted;

an spring member that couples said flange to said clutch plate in a circumferential direction;

an friction coupling portion fixed onto the outer periphery of said clutch plate for engagement with a fly wheel;

a support mechanism disposed between the inner peripheral portion of said clutch plate and outer peripheral portion of said hub for positioning said clutch plate and said hub radially so that said hub is movable with respect to said clutch plate to accommodate a misalignment between said clutch plate and said hub;

an urging member disposed between the inner peripheral portion of said clutch plate and said hub, for urging said clutch plate and said hub radially with respect to one another, thus urging said hub toward a concentric position with respect to said clutch plate; and wherein said urging member comprises an annular portion and a plurality of axially extending claws which extend from said annular portion and which are circumferentially arranged on said annular portion, said claws extending between said clutch plate and said hub.

2. A clutch disc assembly comprising:

a hub having a flange connected to an outer periphery thereof;

a clutch plate having a center hole into which said hub is fitted;

an spring member that couples said flange to said clutch plate in a circumferential direction;

an friction coupling portion fixed onto the outer periphery of said clutch plate for engagement with a flywheel;

a support mechanism disposed between the inner peripheral portion of said clutch plate and outer peripheral portion of said hub for positioning said clutch plate and said hub radially so that said hub is movable with respect to said clutch plate to accommodate a misalignment between said clutch plate and said hub;

an urging member disposed between the inner peripheral portion of said clutch plate and said hub, for urging said clutch plate and said hub radially with respect to one another, thus urging said hub toward a concentric position with respect to said clutch plate;

a second spring member disposed between said hub and said flange, said second spring member being compressible in response to limited rotary displacement between said hub and said flange; and wherein said urging member comprises an annular portion and a plurality of axially extending urging portions which extend from said annular portion and which are circumferentially arranged on said annular portion, said urging portions extending between said clutch plate and said hub, said urging member further formed with a plurality of claws which extend axially from said annular portion and extend between said hub and said flange.

3. The clutch disc assembly as in claim 2, wherein said annular portion is formed with an inner tapered surface and an outer tapered surface and said support mechanism comprises a first friction washer which abuts said hub and a second friction washer attached to said clutch plate, and said inner tapered surface engages said first friction washer and said outer tapered surface engages said second friction washer.

4. The clutch disc assembly as in claim 3, wherein said first friction washer is formed with a tapered surface corresponding to said inner tapered surface and said second friction washer is formed with a tapered surface corresponding to said outer tapered surface.

5. The clutch disc assembly as in claim 3, wherein said inner and outer tapered surfaces have a conical contour.

6. A clutch disc assembly, comprising:

a hub formed with a flange which extends radially outwardly from said hub;

a rotary disc member having a center hole into which said hub is rotatably inserted;

an intermediate disc member disposed about said flange concentric with both said flange and said rotary disc member;

a first spring member disposed between said intermediate disc member and said flange elastically coupling said intermediate disc member and said flange in a circumferential direction;

a second spring member disposed between said rotary disc member and said intermediate disc member elastically coupling said rotary disc member and said intermediate disc member in a circumferential direction, said second spring member being more rigid than said first spring member; and a bushing which includes:

a first annular member which abuts said hub and said flange;

a second annular member which is non-rotatably engaged with said center hole and disposed radially on the outer peripheral side of said first annular member with a gap; and a plurality of leaf springs which are disposed between said first annular member and said second annular member, for urging said first and second annular members towards a concentric orientation.

7. The clutch disc assembly as in claim 6, wherein said second annular member has a plurality of protrusions which are arranged in a circumferential direction and protrude radially inwardly, and each of said leaf springs are retained between adjacent pairs of said protrusions.

8. The clutch disc assembly as in claim 6 further comprising a hysteresis generation mechanism which comprises:

a first friction washer which abuts against said intermediate disc member and which is non-rotatably engaged with said second annular member;

a drive washer which abuts against said first friction washer and which is rotatably engaged with said intermediate disc member;

a second friction washer disposed between said drive washer and said rotary disc member; and a conical spring for urging said intermediate disc member and said rotary disc member toward one another.

9. A clutch disc assembly, comprising:

a hub;

a sub-plate disposed concentrically about an outer portion of said hub;

an elastic member disposed between said hub and said sub-plate limiting relative rotary displacement between said hub and said sub-plate;

a retaining plate and a clutch plate concentrically disposed on opposite sides of said sub-plate and said outer portion of said hub, said retaining plate and said clutch plate being fixed to one another, an inner circumferential portion of said clutch plate being formed with a conical surface;

a second elastic member disposed between portions of said retaining plate, said clutch plate and said sub-plate limiting relative rotation between said retaining plate, said clutch plate and said sub-plate;

a first friction washer disposed between said hub, said sub-plate and said retaining plate, said first friction washer being in contact with said portion of said hub;

a second friction washer disposed between said sub-plate and said retaining plate, said second friction washer being configured to rotate with said retaining plate, said second friction washer engaging said sub-plate such that upon relative rotation between said sub-plate and said retaining plate, said second friction washer undergoes friction engagement against said sub-plate, a portion of said second friction washer being engaged with said first friction washer such that said first friction washer and said second friction washer may not undergo relative rotation with respect to one another;

a third friction washer disposed between said sub-plate and said clutch plate engaged with said clutch plate for rotation therewith, said third friction washer being engaged with said sub-plate such that upon relative rotation between said clutch plate and said sub-plate, said third fiction washer undergoes friction engagement against said sub-plate; and a fourth friction washer disposed between said clutch plate and said outer portion of said hub, said fourth friction washer coupled to said hub for rotation therewith, said fourth friction washer formed with a tapered surface on an outer circumferential portion thereof that contacts said conical surface of said clutch plate.

10. The clutch disc assembly as in claim 9, further comprising:

a first conical spring disposed between said hub and said retaining plate, said first conical spring engaging a portion of said retaining plate and a portion of said first friction washer urging said first friction washer into engagement with said outer portion of said hub;

a second conical spring disposed between said retaining plate and said sub-plate, said second conical spring urging a portion of said first friction washer into engagement with said second friction washer and thus urging said second friction washer into engagement with said sub-plate.

* * * * *